(12) United States Patent
Hertel

(10) Patent No.: US 12,422,307 B2
(45) Date of Patent: Sep. 23, 2025

(54) MEMS THERMAL SENSOR ARRAY

(71) Applicant: Matthew A. Hertel, Washington, DC (US)

(72) Inventor: Matthew A. Hertel, Washington, DC (US)

(*) Notice: Subject to any disclaimer, the term of this patent is extended or adjusted under 35 U.S.C. 154(b) by 426 days.

(21) Appl. No.: 17/971,585

(22) Filed: Oct. 22, 2022

(65) Prior Publication Data

US 2023/0125783 A1 Apr. 27, 2023

Related U.S. Application Data

(60) Provisional application No. 63/270,983, filed on Oct. 22, 2021.

(51) Int. Cl.
*G01K 5/56* (2006.01)

(52) U.S. Cl.
CPC ..................... *G01K 5/56* (2013.01)

(58) Field of Classification Search
CPC ....................................................... G01K 5/56
See application file for complete search history.

(56) References Cited

U.S. PATENT DOCUMENTS

| | | | | |
|---|---|---|---|---|
| 5,117,687 A | * | 6/1992 | Gerardi | G01L 5/223 73/170.15 |
| 2004/0040382 A1 | * | 3/2004 | Peterson | G01L 19/04 73/708 |
| 2010/0181869 A1 | * | 7/2010 | Pereira da Cunha | H03H 9/14541 310/313 R |
| 2011/0317741 A1 | * | 12/2011 | Seefeld | G01K 5/00 374/185 |
| 2013/0222306 A1 | * | 8/2013 | Aberg | G01L 1/2281 374/185 |

FOREIGN PATENT DOCUMENTS

| | | | | |
|---|---|---|---|---|
| CN | 102427101 | * | 4/2012 | ......... H01L 33/0062 |
| CN | 111189493 | * | 12/2020 | |
| EP | 2 634 552 B1 | | 4/2015 | |

OTHER PUBLICATIONS

CN102427101 machine translation (Year: 2012).*
(Continued)

Primary Examiner — Kyung S Lee
(74) Attorney, Agent, or Firm — Canady & Lortz LLP; Bradley K. Lortz

(57) ABSTRACT

A novel high temperature thermal sensing method and device is disclosed that can employ a dual-sensing platinum resistor encased in a mono-crystalline alpha-alumina (sapphire) substrate. The device can comprise four platinum trace elements, oriented with 90° rotational symmetry atop a 1120 oriented crystal lattice substrate. The resistance temperature detectors (RTD) temperature measurement calibration can then be monitored for drift and corrected by comparing the differential strain-derived measurement of temperature to the temperature derived from the RTD measurement. This can allow the device to self-calibrate via comparison of two functionally independent measures of electron mobility and operate in extreme environments which have previously caused RTD sensors to drift from their initial calibration and introduce an undefined measurement error.

13 Claims, 11 Drawing Sheets

(56) References Cited

OTHER PUBLICATIONS

CN111189493 machine translation (Year: 2020).*
Prasser, "Novel Experimental Measuring Techniques Required to Provide Data for CFD Validation," Nucl. Eng. Des., vol. 238, No. 3, pp. 744-770, Mar. 2008, doi: 10.1016/j.nucengdes.2007.02.050.
Wei et al., "Design, Operation and Maintenance of Thermal Hydraulic Instrumentation System of HTR-10," in 18th International Conference on Nuclear Engineering: vol. 1, Xi'an, China, 2010, pp. 59-65, doi: 10.1115/ICONE18-29139.
Ball et al., "HTGR Measurements and Instrumentation Systems," ORNL/TM-2012/107, 1040751, May 2012. doi: 10.2172/1040751.
Kim et al., "Measurement of Flow Direction and Velocity Using a Micromachined Flow Sensor," Sens. Actuators Phys., vol. 114, No. 2-3, pp. 312-318, Sep. 2004, doi: 10.1016/j.sna.2003.12.019.
Ahn et al., "Direct Fabrication of Thin Film Gold Resistance Temperature Detection Sensors on a Curved Surface Using a Flexible Dry Film Photoresist and Their Calibration Up to 450° C.," J. Micromechanics Microengineering, vol. 23, No. 6, p. 065031, Jun. 2013, doi: 10.1088/0960-1317/23/6/065031.
Sun et al., "Fabrication and Characterization of a Double-Heater Based MEMS Thermal Flow Sensor," Sens. Actuators Phys., vol. 193, pp. 25-29, Apr. 2013, doi: 10.1016/j.sna.2013.01.010.
Schwerter et al., "Flexible Hot-Film Anemometer Arrays on Curved Structures for Active Flow Control on Airplane Wings," Microsyst. Technol., vol. 20, No. 4-5, pp. 821-829, Apr. 2014, doi: 10.1007/s00542-013-2054-y.
Miyakawa et al., "MEMS-based microthruster with integrated platinum thin film resistance temperature detector (RTD), heater meander and thermal insulation for operation up to 1,000° C.," Microsyst. Technol., vol. 18, No. 7-8, pp. 1077-1087, Aug. 2012, doi: 10.1007/s00542-012-1441-0.
Devoe, "Thermal issues in MEMS and microscale systems," IEEE Trans. Compon. Packag. Technol., vol. 25, No. 4, pp. 576-583, Dec. 2002, doi: 10.1109/TCAPT.2003.809110.
Korsah et al., "Assessment of Sensor Technologies for Advanced Reactors," ORNL/TM-2016/337, 1345781, Oct. 2016. doi: 10.2172/1345781.
Yang, "A Silicon Carbide Wireless Temperature Sensing System for High Temperature Applications," Sensors, vol. 13, No. 2, pp. 1884-1901, Feb. 2013, doi: 10.3390/s130201884.
Ji et al., "A Novel Surface LC Wireless Passive Temperature Sensor Applied in Ultra-High Temperature Measurement," IEEE Sens. J., vol. 19, No. 1, pp. 105-112, Jan. 2019, doi: 10.1109/JSEN.2018.2872915.
Wang et al., "A Passive Wireless Temperature Sensor for Harsh Environment Applications," Sensors, vol. 8, No. 12, pp. 7982-7995, Dec. 2008, doi: 10.3390/s8127982.
Thai et al., "Novel Design of a Highly Sensitive RF Strain Transducer for Passive and Remote Sensing in Two Dimensions," IEEE Trans. Microw. Theory Tech., vol. 61, No. 3, pp. 1385-1396, Mar. 2013, doi: 10.1109/TMTT.2013.2243751.
Tan et al., "Wireless Passive Temperature Sensor Realized on Multilayer HTCC Tapes for Harsh Environment," J. Sens., vol. 2015, pp. 1-8, 2015, doi: 10.1155/2015/124058.
Sim et al., "Thin-film resistance temperature detector array for the measurement of temperature distribution inside a phantom," Metrologia, vol. 55, No. 1, pp. L5-L11, Feb. 2018, doi: 10.1088/1681-7575/aa90bd.
Wrbanek et al., "Thin Film Physical Sensor Instrumentation Research and Development at NASA Glenn Research Center," presented at the ISA.
Cui et al., "Fabrication and characterization of nickel thin film as resistance temperature detector," Vacuum, vol. 176, p. 109288, Jun. 2020, doi: 10.1016/j.vacuum.2020.109288.
Henning et al., "A MEMS-based, high-sensitivity pressure sensor for ultraclean semiconductor applications," in 13th Annual IEEE/SEMI Advanced Semiconductor Manufacturing Conference. Advancing the Science and Technology of Semiconductor Manufacturing. ASMC 2002 (Cat. No.02CH37259), Boston, MA, USA, 2002, pp. 165-168, doi: 10.1109/ASMC.2002.1001596.
Hao et al., "Zero temperature coefficient gas-sealed pressure sensor using mechanical temperature compensation," in 2011 16th International Solid-State Sensors, Actuators and Microsystems Conference, Beijing, China, Jun. 2011, pp. 116-119, doi: 10.1109/TRANSDUCERS.2011.5969152.
Saremi et al., "A MEMS-based hot-film thermal anemometer with wide dynamic measurement range," in IEEE Sensors 2014 Proceedings, Valencia, Spain, Nov. 2014, pp. 420-423, doi: 10.1109/ICSENS.2014.6985024.
Mailly et al., "Anemometer with hot platinum thin film," p. 7, 2001.
Yang et al., "Micro anemometer by a MEMS compatible lab-on-a-tube technology," in 2015 Transducers—2015 18th International Conference on Solid-State Sensors, Actuators and Microsystems (Transducers), Anchorage, AK, USA, Jun. 2015, pp. 383-386, doi: 10.1109/TRANSDUCERS.2015.7180941.
Kuo et al., "Micromachined Thermal Flow Sensors—A Review," Micromachines, vol. 3, No. 3, pp. 550-573, Jul. 2012, doi: 10.3390/mi3030550.
Park et al., "A flow direction sensor fabricated using MEMS technology and its simple interface circuit," Sens. Actuators B Chem., vol. 91, No. 1-3, pp. 347-352, Jun. 2003, doi: 10.1016/S0925-4005(03)00109-6.
Kim et al., "A circular-type thermal flow direction sensor free from temperature compensation," Sens. Actuators Phys., vol. 108, No. 1-3, pp. 64-68, Nov. 2003, doi: 10.1016/S0924-4247(03)00268-1.
Buchner et al., "A high-temperature thermopile fabrication process for thermal flow sensors," Sens. Actuators Phys., vol. 130-131, pp. 262-266, Aug. 2006, doi: 10.1016/j.sna.2006.02.009.
Lyons et al., "A high-speed mass flow sensor with heated silicon carbide bridges," in Proceedings MEMS 98. IEEE. Eleventh Annual International Workshop on Micro Electro Mechanical Systems. An Investigation of Micro Structures, Sensors, Actuators, Machines and Systems (Cat. No.98CH36176), Heidelberg, Germany, 1998, pp. 356-360, doi: 10.1109/MEMSYS.1998.659782.
Bensidhoum et al., "Fabrication flaws and reliability in MEMS thin film polycrystalline flow sensor," Microsyst. Technol., vol. 20, No. 1, pp. 1-7, Jan. 2014, doi: 10.1007/s00542-013-1977-7.
Shen et al., "Direct Write Fabrication of Platinum-Based Thick-Film Resistive Temperature Detectors," IEEE Sens. J., vol. 18, No. 22, pp. 9105-9111, Nov. 2018, doi: 10.1109/JSEN.2018.2869850.
Sardini et al., "Wireless Measurement Electronics for Passive Temperature Sensor," IEEE Trans. Instrum. Meas., vol. 61, No. 9, pp. 2354-2361, Sep. 2012, doi: 10.1109/TIM.2012.2199189.
English et al., "Wireless micromachined ceramic pressure sensors," in Technical Digest. IEEE International MEMS 99 Conference. Twelfth IEEE International Conference on Micro Electro Mechanical Systems (Cat. No.99CH36291), Orlando, FL, USA, 1999, pp. 511-516, doi: 10.1109/MEMSYS.1999.746881.
Fonseca et al., "Wireless micromachined ceramic pressure sensor for high-temperature applications," J. Microelectromechanical Syst., vol. 11, No. 4, pp. 337-343, Aug. 2002, doi: 10.1109/JMEMS.2002.800939.
Chevalerias et al., "Inductive Telemetry of Multiple Sensor Modules," IEEE Pervasive Comput., vol. 4, No. 1, pp. 46-52, Jan. 2005, doi: 10.1109/MPRV.2005.15.
Mukherjee, "Chipless Radio Frequency Identification by Remote Measurement of Complex Impedance," in 2007 European Conference on Wireless Technologies, Munich, Germany, Oct. 2007, pp. 249-252, doi: 10.1109/ECWT.2007.4403993.
Miczulski et al., "A New Autocalibration Procedure in Intelligent Temperature Transducer," IEEE Trans. Instrum. Meas., vol. 68, No. 3, pp. 895-902, Mar. 2019, doi: 10.1109/TIM.2018.2857901.
Pokhodun et al., "Platinum Resistance Thermometry," p. 56.
Wang et al., "Laser machined ultrathin microscale platinum thermometers on transparent oxide substrates," Sens. Actuators Phys., vol. 300, p. 111657, Dec. 2019, doi: 10.1016/j.sna.2019.111657.
Rayotek, "Sapphire Orientation Definitions & Drawing." https://rayotek.com/PDF/Orientation-Definitions-and-Drawing.pdf, Rayotek, 2021.

(56) References Cited

OTHER PUBLICATIONS

Vishay, "Measurement of Thermal Expansion Coefficient Using Strain Gages." Micro-Measurements, Nov. 1, 2010, Vishay Precision Group, Accessed: Sep. 10, 2020. [Online].

Han et al., "MEMS-based Pt film temperature sensor on an alumina substrate," Mater. Lett., vol. 125, pp. 224-226, Jun. 2014, doi: 10.1016/j.matlet.2014.03.170.

Dinh et al., "Thermoresistive Effect for Advanced Thermal Sensors: Fundamentals, Design Considerations, and Applications," J. Microelectromechanical Syst., vol. 26, No. 5, pp. 966-986, Oct. 2017, doi: 10.1109/ JMEMS.2017.2710354.

Bal, "Characterization of Sapphire: for its material properties at High Temperatures," p. 56.

Lin et al., "The impact of thermal annealing on the temperature dependent resistance behavior of Pt thin films sputtered on Si and Al2O3 substrates," Thin Solid Films, vol. 685, pp. 372-378, Sep. 2019, doi: 10.1016/j.tsf.2019.06.036.

Yi et al., "Interactions of Adhesion Materials and Annealing Environment on Resistance and Stability of MEMS Platinum Heaters and Temperature Sensors," J. Microelectromechanical Syst., vol. 24, No. 4, pp. 1185-1192, Aug. 2015, doi: 10.1109/JMEMS.2015.2394483.

Schossler et al., "Effect of high temperature annealing on resistivity and temperature coefficient of resistance of sputtered platinum thin films of SiO2/Pt/SiOx interfaces," Thin Solid Films, vol. 698, p. 137877, Mar. 2020, doi: 10.1016/j.tsf.2020.137877.

Bernhardt et al., "Performance of Zr and Ti adhesion layers for bonding of platinum metallization to sapphire substrates," Sens. Actuators B Chem., vol. 77, No. 1-2, pp. 368-374, Jun. 2001, doi: 10.1016/S0925-4005(01) 00756-0.

Wrbanek et al., "Preparation and Analysis of Platinum Thin Films for High Temperature Sensor Applications," p. 26, 2005.

Yadav et al., "Analysis of grain topology and volumetric growth rate relation in three-dimensional normal grain growth," Acta Mater., vol. 156, pp. 275-286, Sep. 2018, doi: 10.1016/j.actamat.2018.04.056.

Li et al., "Molecular dynamics simulation of mechanical properties of nanocrystalline platinum: Grain-size and temperature effects," Phys. Lett. A, vol. 383, No. 16, pp. 1922-1928, Jun. 2019, doi: 10.1016/j.physleta.2018.10.053.

\* cited by examiner

MEMS THERMAL SENSOR ARRAY

CROSS-REFERENCE TO RELATED APPLICATION

This application claims the benefit under 35 U.S.C. § 119(e) of the following U.S. provisional patent application, which is incorporated by reference herein:
U.S. Provisional Patent Application No. 63/270,983, filed Oct. 22, 2021, and entitled "MEMS THERMAL SENSOR ARRAY," by Matthew A. Hertel.

BACKGROUND OF THE INVENTION

1. Field of the Invention

This invention relates to thermal sensors. Particularly, this invention relates to micro-electro-mechanical systems (MEMS) thermal sensor arrays which can be used for pebble bed high-temperature gas-cooled reactors (HTGRs).

DESCRIPTION OF THE RELATED ART

The discovery of nuclear interactions and development of subatomic physics in the late 20th century has enabled the use of nuclear chain reactions to produce the heat required to generate electrical energy. This form of thermal production has shown significant benefits when compared to combustion driven generation, and is capable of production on the scale required by society's ever-expanding energy needs without vast resource requirements or large volumes of waste generation. A defining characteristic of the nuclear energy industry is the highly integrated safety culture concerned with preventing the accidental exposure of the public to nuclear materials. The unique focus on safety is in response to the relatively high potential for degradation of societal wellbeing and extensive capital damages associated with widespread radiological contamination. One method of reducing the risk of radiological release is to reduce the probability associated with severe accidents.

The primary product of a nuclear reactor is heat. To generate the largest amount of heat that is economically feasible requires a thorough understanding of the processes by which that heat is produced in the reactor core and the method by which it is transported and converted into other forms of energy. Accordingly, high temperature measurement is a critical metric for monitoring such processes.

In the case of safety analysis for advanced reactor designs, the most applicable experimental validation data must be collected from an environment similar to that which is expected in the worst-case accident scenarios. For the high-temperature gas-cooled reactor (HTGR) family of designs, this means collecting data in an environment that presents considerable engineering challenges. The high-temperature and complex core geometry utilized by HTGRs poses challenges for the modern measurement techniques typically used to gather data used for simulation validation. Thus, the task of developing new methods of data collection from these environments is the opportunity this research endeavor seeks to address.

Although water-cooled reactor designs do have many features which are favorable for commercial deployment, the future of nuclear power must leverage the advantages of advanced reactor designs which utilize other coolant types if further utility and efficiency is sought from new installations. Future deployment of the PBMR-CG or MHTGR; or a similar HTGR design, is primarily challenged by a current lack of regulatory knowledge and a significant lack of analytical tools when compared to water-cooled reactor systems. This provides further motivation for characterization of HTGR thermal hydraulics through development of advanced instrumentation.

Testing facilities and measurement systems are often purpose-built to address a specific accident scenario or to characterize the performance and response of a specific system due to this increased demand for highly discretized, highly accurate measurements. In the case of HTGR thermal hydraulic analysis, high temperature testing facilities are utilized to gather high-fidelity safety analysis simulation validation data. Given the considerable challenges for deployment of instrumentation in the core of an operating reactor, a more practical target for instrumentation development is initial deployment in a thermal hydraulic testing facility.

Most analytical methods currently in use for HTGR systems employ bulk flow or volume averaged techniques and lack the refinement to evaluate transient flow structures at a spatial scale useful for mesoscale core design purposes. To improve the ability to collect validation data for emerging analytical techniques, it is vital that methods for collection of local-scale heat transfer data are developed. An instrument with a very small footprint, a rugged construction, and a means for flexible data transmission would be ideal. As described in the next section, the need for high spatial resolution measurements in other industries has created a demand for this type of device as well. Application to HTGR thermal hydraulics is a matter of increasing the durability of the instrument to survive and maintain measurement accuracy in the harsh core environment and tailoring the specific sensor design to the heat transfer phenomena being targeted for investigation.

Relevant applications of MEMS technology as heat transfer metrology have been demonstrated for the aerospace, automotive, and industrial power production industries; however, applications for nuclear thermal hydraulic instrumentation have yet to be demonstrated, despite a number of key opportunities. A number of MEMS-based instruments employing elements under 200 μm in size, including thin-film resistance temperature detectors (RTDs) and a thermal anemometer assembly, have been developed. These devices are typically minimally invasive with very small power requirements, meaning they are ideal for instrument array applications. This is meaningful for thermal hydraulic experimentation applications because it means that single point instruments can be deployed in a field dense enough to validate high resolution numerical results common for modern thermal hydraulic simulation efforts. Thus, MEMS fabrication techniques can be particularly suitable for the intended application and can be selected as the design basis for development of a specialized instrument for use in HTGR core thermal environments.

A number of strategies exist for MEMS temperature measurement with varying strengths and shortcomings related to high temperature operation. Among the possible hardware configurations are thermocouples, RTDs, and CMOS semiconductor temperature detectors. Variable resistance class instruments have very simple geometry and are among the most well-characterized and accurate instrument types conducive to MEMS fabrication techniques. The function of a variable resistance thermal sensor is not reliant on semiconductor physics, and thus can avoid a considerable difficulty presented by thermal noise in low bandgap materials, which limits the high-temperature applicability of semiconductor based MEMS instruments. Variable resistance thermal sensors instead rely on measuring electrical resistance which varies predominantly as a function of temperature.

In view of the foregoing, there is a need in the art for a temperature sensing methods and devices for reactors, particularly for pebble bed high-temperature gas-cooled reactors (HTGRs). Further, there is a need for such temperature sensing methods and devices employing micro-electro-mechanical systems (MEMS) thermal sensor arrays. These and other needs are met by embodiments of the present invention as described hereafter.

SUMMARY OF THE INVENTION

A novel high temperature thermal sensing method and device is disclosed that can employ a dual-sensing platinum resistor encased in a mono-crystalline alpha-alumina (sapphire) substrate. The device can comprise four platinum trace elements, oriented with 90° rotational symmetry atop a 1120 oriented crystal lattice substrate. The resistance temperature detectors (RTD) temperature measurement calibration is then monitored for drift and corrected by comparing the differential strain-derived measurement of temperature to the temperature derived from the RTD measurement. This allows the instrument to self-calibrate via comparison of two functionally independent measures of electron mobility and operate in extreme environments which have previously caused RTD sensors to drift from their initial calibration and introduce an undefined measurement error. The intended deployment configuration and instrument construction can be defined in terms of MEMS fabrication processes and performance of the sensor can be simulated to evaluate and confirm the functional applicability of the instrument for operation in pebble bed HTGR thermal environments:

A typical embodiment of the invention can comprise a temperature sensor having a nonconducting substrate having a surface aligned with a plane of the substrate and exhibiting an anisotropic coefficient of thermal expansion (CTE) in the plane and electrical traces bonded to the surface of the nonconducting substrate, the electrical traces comprising four meander-lines forming a Wheatstone bridge circuit. The nonconducting substrate can comprise sapphire. Further, the plane of the substrate can be oriented with a 1120 crystal lattice of the sapphire. In addition, the electrical traces can comprise platinum. Improved sensitivity can be achieved if a highest CTE of the anisotropic CTE in the plane of the substrate is aligned with a pair of the electrical traces. This temperature sensor embodiment can be further modified consistent with the any other embodiment of the invention described herein.

Further embodiments can include a graphite spherical pebble where the nonconducting substrate is disposed on a surface of the graphite spherical pebble. The graphite spherical pebble can comprise a port from the nonconducting substrate to a central cavity for housing transmitting electronics. The transmitting electronics can include transponders for wireless communication.

In further embodiments the temperature sensor can include a first electrical contact, a second electrical contact, a third electrical contact, and a fourth electrical contact, wherein the electrical traces comprise; a first meander-line trace having a first pair of opposite ends electrically coupled respectively to the first electrical contact and the second electrical contact; a second meander-line trace having a second pair of opposite ends electrically coupled respectively to the second electrical contact and the third electrical contact; a third meander-line trace having a third pair of opposite ends electrically coupled respectively to the third electrical contact and the fourth electrical contact, and a fourth meander-line trace having a fourth pair of opposite ends electrically coupled respectively to the fourth electrical contact and the first electrical contact. The nonconducting substrate can comprise a circular shape and the first electrical contact, the second electrical contact, the third electrical contact, and the fourth electrical contact can be disposed proximate a circumferential edge of the circular shape ninety degrees apart from one another. The first meander-line trace, the second meander-line trace, the third meander-line trace and the fourth meander-line trace can each occupy separate radial quadrants of the circular shape between the first electrical contact and the second electrical contact, between the second electrical contract and the third electrical contact, between the third electrical and the fourth electrical contact, and between the fourth electrical contact and the first electrical contact, respectively, having ninety degree rotational symmetry. Further, each of the first electrical contact, the second electrical contact, the third electrical contact, and the fourth electrical contact can comprise a via to an opposite side of the nonconducting substrate for coupling sensor driving and signals. The first meander-line trace, the second meander-line trace, the third meander-line trace, and the fourth meander-line trace can be electrically connected through the first electrical contact, the second electrical contact, the third electrical contact, and the fourth electrical contact to form the Wheatstone bridge circuit.

Another embodiment of the invention can comprise a temperature sensor having a nonconducting substrate having a surface; a first electrical contact; a second electrical contact; a third electrical contact; a fourth electrical contact; a first meander-line trace disposed on the surface and having a first pair of opposite ends electrically coupled respectively to the first electrical contact and the second electrical contact; a second meander-line trace disposed on the surface and having a second pair of opposite ends electrically coupled respectively to the second electrical contact and the third electrical contact; a third meander-line trace disposed on the surface and having a third pair of opposite ends electrically coupled respectively to the third electrical contact and the fourth electrical contact; and a fourth meander-line trace disposed on the surface and having a fourth pair of opposite ends electrically coupled respectively to the fourth electrical contact and the first electrical contact. The surface of the nonconducting substrate can be aligned with a plane exhibiting an anisotropic coefficient of thermal expansion (CTE); and the first meander-line trace, the second meander-line trace, the third meander-line trace, and the fourth meander-line trace are all bonded to the surface of the nonconducting substrate, the electrical traces comprising four meander-lines forming a Wheatstone bridge circuit. Here as well, the nonconducting substrate can comprise sapphire and the sapphire can comprise a 1120 crystal lattice oriented with the plane of the substrate. The first meander-line trace, the second meander-line trace, the third meander-line trace, and the fourth meander-line trace can each comprise platinum. Further, a highest CTE of the anisotropic CTE of the plane of the nonconducting substrate can be aligned with the first meander-line trace and the third meander-line trace in order to improve sensitivity. This temperature sensor embodiment can be further modified consistent with the any other embodiment of the invention described herein.

Another embodiment of the invention can comprise a temperature sensor having a graphite spherical pebble having at least one nonconducting substrate supporting a Wheatstone bridge trace temperature sensor disposed on a surface of the graphite spherical pebble over a port to a central cavity, the Wheatstone bridge trace temperature sensor comprising four meander-line traces and having four electrical contacts for measuring temperature; and sensor wiring for the Wheatstone bridge trace temperature sensor is coupled from the four electrical contacts through the port to the central cavity of the graphite spherical pebble. As with the other embodiments, the nonconducting substrate can comprise sapphire and the plane of the substrate can be oriented with a 1120 crystal lattice of the sapphire. The electrical traces can comprise platinum. A highest CTE of an anisotropic CTE of the surface of the nonconducting substrate can be aligned with an opposing pair of the four meander-line traces. This temperature sensor embodiment can be further modified consistent with the any other embodiment of the invention described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Overview

Figures 1A, 1B:
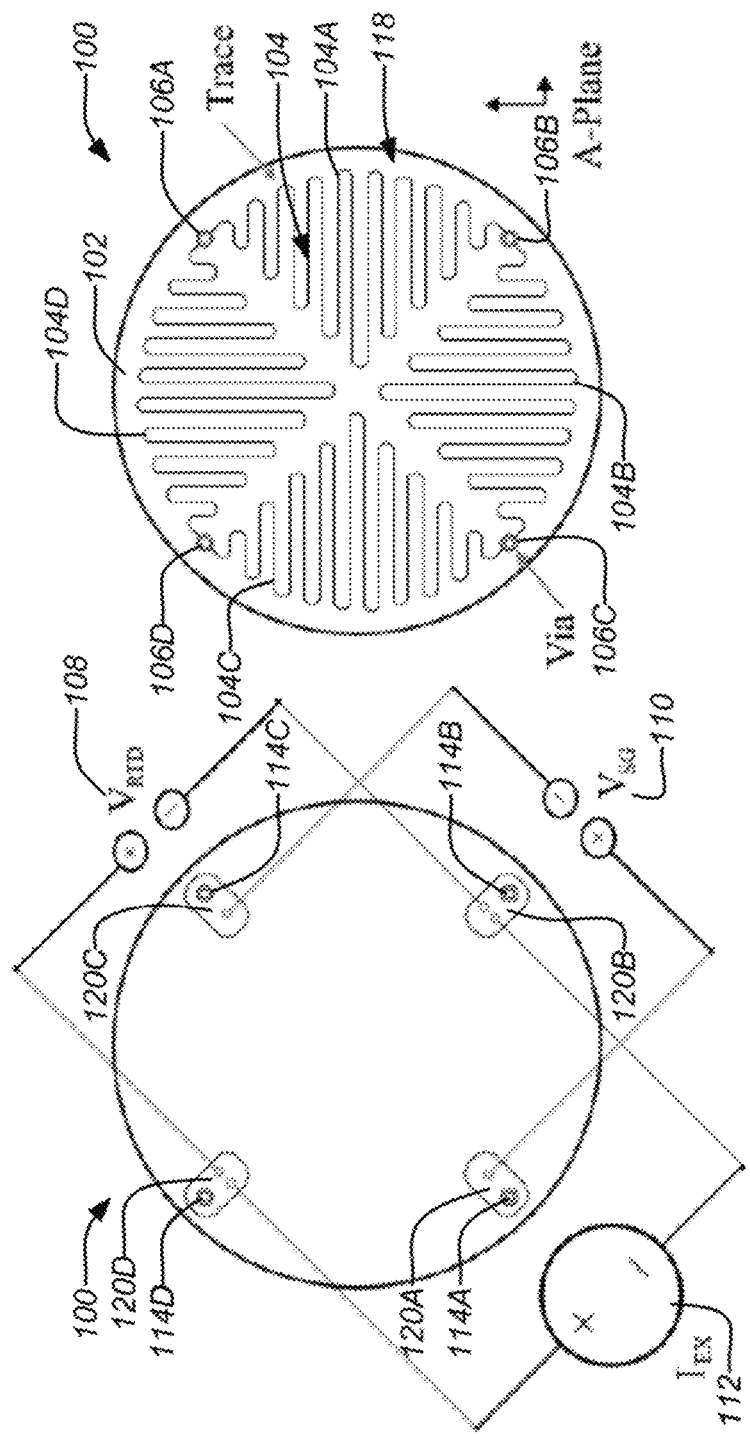
FIGS. 1A and 1B illustrate a front and back, respectively, of an exemplary temperature sensor embodiment of the invention (4-5)

As previously mentioned, the function of a variable resistance thermal sensor is not reliant on semiconductor physics, and thus can avoid a considerable difficulty presented by thermal noise in low bandgap materials, which limits the high-temperature applicability of semiconductor based MEMS instruments. Variable resistance thermal sensors instead rely on measuring electrical resistance which varies predominantly as a function of temperature. Thus, embodiments of the present invention can utilize a thin-film resistance temperature detector (RTD) class of sensor implemented with MEMS-based fabrication due to these favorable characteristics for the intended application.

Concerning the deployment configuration of the instrument, embodiments of the present invention can be a surface mounted instrument package. Sensors embodiments can utilize an array formation to measure heat transfer parameters in the core of an HTGR can be mounted directly to the surface of a coolant interface, such as the outside surface of a pebble bed fuel element. The form factor can be as minimally invasive as possible. If deployed in a pebble bed HTGR, the instrument can utilize some form of wireless signal transmission so that the dynamic motion of pebble bed fuel elements is not impeded by the presence of instrumentation hardware or signal transmission wires. Although wireless signal transmission is an extremely difficult design criteria to implement for the targeted HTGR thermal hydraulic test facility environment, it can fundamentally improve the applicability of the instrument for pebble bed HTGR configurations. In addition, the low power requirements and sensor density are both favorable characteristics for implementation of wireless signal transmission.

Utilizing the favorable economics of mass production for MEMS fabrication, embodiments of the present invention can be fabricated into a surface mounted package that can be widely deployed during fuel assembly manufacturing. If multiple uniform thin-film RTDs are integrated into a single instrument package, interdependent functional parameters can be utilized which could help to mitigate the effects of harsh environment calibration drift and other adverse signal distortion effects.

With all of these considerations in mind, the MEMS class of instrument hardware presents a number of favorable characteristics which are well aligned with the deployment and operation targets for development of a specialized thermal instrumentation package for HTGR core environments consistent with embodiments of the present invention. Embodiments of the invention are directed to methods and devices for a novel MEMS temperature sensor which was first described in M. Hertel, "Development of a Novel MEMS Thermal Sensor Array for Pebble Bed HTGRs," Scholars Archive, Oregon State University Libraries & Press, Nov. 15, 2020, by the inventor, which is incorporated by reference herein.

1.1 Exemplary Temperature Sensing Device

Exemplary embodiments of the present invention are directed to a novel high temperature thermal instrument which can utilize a dual-sensing platinum resistor encased in a mono-crystalline alpha-alumina (sapphire) substrate. An exemplary instrument embodiment comprises four platinum trace elements, oriented with 90° rotational symmetry atop a 1120 oriented crystal lattice substrate. All four of these sensors measure temperature directly via 4-wire ohm measurement of the absolute resistance, while two sets of orthogonal sensors measure the differential strain created by the axially dependent thermal expansion coefficient of a sapphire substrate via a Wheatstone bridge (WSB) measurement. The resistance temperature detector (RTD) temperature measurement calibration is then monitored for drift and corrected by comparing the differential strain-derived measurement of temperature to the temperature derived from the RTD measurement. This allows the instrument to self-calibrate via comparison of two functionally independent measures of electron mobility and operate in extreme environments which have previously caused RTD sensors to drift from their initial calibration and introduce an undefined measurement error. The intended deployment configuration and instrument construction is defined in terms of MEMS fabrication processes and performance of the sensor is simulated to evaluate and confirm the functional applicability of the instrument for operation in pebble bed HTGR thermal environments.

FIGS. 1A and 1B illustrate a front and back, respectively, of an exemplary temperature sensor 100 embodiment of the invention. The exemplary temperature sensor 100 comprises a nonconducting substrate 102 having a surface 118 aligned with a plane of the nonconducting substrate 102 exhibiting an anisotropic coefficient of thermal expansion. Electrical traces 104 are bonded to the surface 118 of the nonconducting substrate 102. Each of electrical traces 104 comprises a meander-line. The four electrical traces 104 are electrically coupled to form a Wheatstone bridge circuit which is used to measure the temperature of the substrate 102. Typically, the nonconducting substrate 102 can comprise sapphire and the plane of the substrate 102 can be oriented with a 1120 crystal lattice of the sapphire. The electrical traces 104 can comprise platinum.

The temperature sensor 100 included a first electrical 106A, a second electrical contact 106B, a third electrical contact 106C and a fourth electrical contact 106D. The electrical traces comprise a first meander-line trace 104A, a second meander-line trace 104B, a third meander-line trace 104C and a fourth meander-line trace 104D. The first meander-line trace 104A has a first pair of opposite ends electrically coupled respectively to the first electrical contact 106A and the second electrical contact 106B. The second meander-line trace 104B has a second pair of opposite ends electrically coupled respectively to the second electrical contact 106B and the third electrical contact 106C. The third meander-line trace 104C has a third pair of opposite ends electrically coupled respectively to the third electrical contact 106C and the fourth electrical contact 106D. The fourth meander-line trace 104D has a fourth pair of opposite ends electrically coupled respectively to the fourth electrical contact 106D and the first electrical contact 106A. Typically, the nonconducting substrate 102 can comprise a circular shape with the first electrical contact 106A, the second electrical contact 106B, the third electrical contact 106C, and the fourth electrical contact 106D disposed proximate the circumferential edge of the circular shape ninety degrees apart from one another. However, those skilled in the art will appreciate that any suitable shape and electrical contact placement can be employed consistent with embodiments of the invention as described herein.

Within the circular shape of the substrate 102 of the exemplary embodiment, the first meander-line trace 104A, the second meander-line trace 104B, the third meander-line trace 104C and the fourth meander-line trace 104D can each occupy separate radial quadrants between the first electrical contact 106A and the second electrical contact 106B, between the second electrical contract 106B and the third electrical contact 106C, between the third electrical 106C and the fourth electrical contact 106D, and between the fourth electrical contact 106D and the first electrical contact 106A, respectively, having ninety degree rotational symmetry.

Each of the first electrical contact 106A, the second electrical contact 106B, the third electrical contact 106C, and the fourth electrical contact 106D can comprise a via 114A, 114B, 114C, and 114D to an opposite side of the nonconducting substrate 102 for coupling out sensor driving and signals. It should also be noted that the electrical contacts 106A, 106B, 106C, and 106D are each considered to exist electrically on either side of the substrate 102 in this case as the vias couple electrical connection through the substrate 102. Accordingly, an electrical termination pad 120A, 120B, 120C, and 120D can be disposed on the opposite side of the substrate 102 coupled to each via 114A, 114B, 114C, and 114D, respectively. The electrical termination pads 120A, 120B, 120C, and 120D are used to couple out voltage measurement and current driving for the Wheatstone bridge circuit to measure temperature as described hereafter.

In the exemplary temperature sensor 100, the first meander-line trace 104A, the second meander-line trace 104B, the third meander-line trace 104C, and the fourth meander-line trace 104D are electrically connected through the first electrical contact 106A, the second electrical contact 106B, the third electrical contact 106C, and the fourth electrical contact 106D to form the Wheatstone bridge circuit. Each meander-line trace comprises primary linear elements oriented parallel with one another having only short turns connecting the primary linear elements. Notably, the meander-lines of both the first meander-line trace 104A and the third meander-line trace 104C are disposed on the substrate 102 such that both their primary linear elements are parallel with each other, i.e. horizontally in FIG. 1A. Similarly, the meander-lines of both the second meander-line trace 104B and the fourth meander-line trace 104D are disposed on the substrate 102 such that both their primary linear elements are parallel with each other, i.e. vertically in FIG. 1A. This means that the primary linear elements of the meander-lines of both the first meander-line trace 104A and the third meander-line trace 104C are perpendicular to the primary linear elements of the meander-lines of both the second meander-line trace 104B and the fourth meander-line trace 104D. Thus, each opposing pair of meander-line traces are aligned with each other while being perpendicular to the other opposing pair of meander-line traces. As will be appreciated by those skilled in the art, a key feature of the present invention is employing a substrate material exhibiting an anisotropic CTE. Moreoever, selecting a particular plane of the substrate material to be aligned with the surface to which the electrical traces are bonded enhances the functional benefit. Further, sensitivity of the temperature sensor is improved by aligning the axis of the highest CTE within the anisotropic CTE plane aligned with the surface with one of the opposing pairs of electrical traces forming the Wheatstone bridge. It should be noted that reference to "alignment" of the meander-line traces discussed in the application refers to the orientation of the primary linear elements of the meander-line. For example, the alignment of a meander-line trace with the highest CTE of the surface of the anisotropic CTE of the supporting substrate means that the primary linear elements of the meander-line trace are oriented to align with the highest CTE.

The temperature sensor 100 is employed with an excitation current 112 so that the voltage differential 108 can be measured across the second and fourth electrical contacts 106B, 106D and the bridge voltage 110 is then found across the first and third electrical contacts 106A, 106C as a function of the excitation voltage and the meander-line trace 104A, 104B, 104C, 104D resistances. Details of temperature sensor 100 operation are described hereafter. The voltage differential 108 measures the voltage differential to determine the change in resistance of the traces.

Embodiments of the invention comprise a novel MEMS thermal sensor array that can mitigate the environmental effects which typically prelude instrument failure in HTGR thermal environments. The fabrication of the proposed instrument is not trivial and requires a complex series of thin film or MEMS fabrication processes to produce a sensor with precise geometry and material properties required for robust, accurate operation in the target environment.

Embodiments of the invention can address high probability accident scenarios which have little validation data using a novel instrument design specifically developed for the high temperature environment found in a HTGR core, Embodiments of the invention identify an approach to high temperature metrology that enables expanded applicability of resistive temperature sensors to high temperature environments. Commercial facilities outside of the nuclear sector can also benefit from the development of high-temperature sensor arrays and additional applications for the techniques developed herein.

HTGR core geometry is primarily defined by the choice of prismatic block or pebble bed configurations. The pebble bed core geometry presents a significant number of challenges in addition to those presented by the prismatic block core geometry; thus, developing an instrument that is suitable for pebble bed geometry would likely also be suitable for prismatic block geometry. The purpose indicates a motivation to develop instruments for collection of validation data, requiring that the pebble bed geometry be chosen as a design basis so that the results may be widely applicable to all HTGR designs and thermal environments.

Figure 1C:
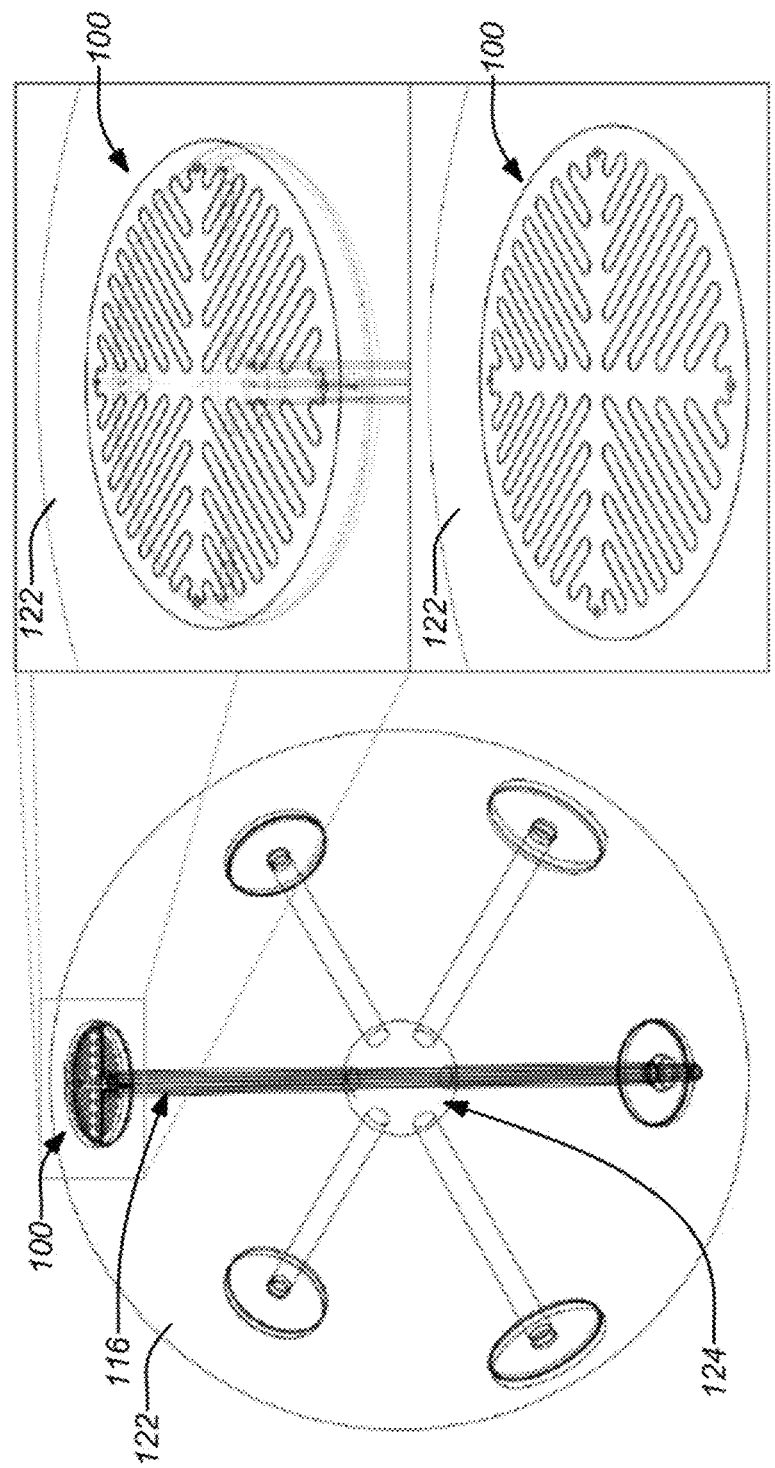
FIG. 1C illustrates an exemplary temperature sensor embodiment of the invention with mounting configuration and signal wire routing in an unfueled spherical pebble (4-6)

FIG. 1C illustrates an exemplary temperature sensor 100 embodiment of the invention with mounting configuration and signal wire routing within an unfueled spherical pebble 122. The spherical pebble 122 can comprise an unfueled graphite spherical pebble where the nonconducting substrate 102 is disposed on a surface of the unfueled graphite spherical pebble 122. The vias 114A, 114B, 114C, and 114D, and electrical termination pads 120A, 120B, 120C, and 120D on the opposite side of the substrate facilitate use with the spherical pebble 122 in this manner. The spherical pebble 122 can comprise a port 116 from the nonconducting substrate 102 to carry the sensor wiring to a central cavity 124 for housing temperature sensing electronics.

This exemplary pebble configuration allows for multiple sensors mounted on the surface of the pebble and a small channel for each allows for wiring to be passed through to the central cavity 124 of the pebble to be collected, anchored, and then passed out of the pebble as one multistranded cable bundle. Note that the resistance of this lead cable can be virtually eliminated when utilizing a four wire resistance measurement, so it can be assumed that the measurement quality would not be degraded. This would essentially be a pebble on a tether, which is useful in some specific applications. However, alternatively coupling these sensors to a wireless transmitter that can power scavenge the needed energy to collect a measurement can be an ideal deployment configuration.

Embodiments of the invention can be implemented with a deployment form which utilizes a surface mounted thin film RTD array on an unfueled graphite fuel pebble which utilizes wireless signal transfer in an operational HTGR environment. However, the practical deployment can also include a wired instrument in a thermal hydraulic testing facility. By targeting the expanded functional capability when possible, the extension of the presented exemplary embodiments toward that expanded use case should be relatively straightforward. To support this approach, operational data from a selected HTGR environment can be utilized to develop target operational parameters for exemplary embodiments described herein.

2.1 Harsh Environment Calibration Drift Mitigation Strategy

MEMS thermal sensor embodiments of the invention can be developed to utilize several different types of physical processes to measure thermal properties for a wide range of applications. The type of sensor employed with embodiments of the invention is the resistance temperature detector (RTD), which measures the electrical resistance of a sensing element to indirectly determine the temperature of a target environment.

RTDs provide extremely precise and accurate measurements of temperature with fast response times and good signal quality in ideal environments, but have operational constraints which limit their applicability in harsh environments. This is mostly due to a range of environmental effects that cause the resistance-to-temperature calibration curve to drift over time. These effects can be mitigated by utilizing two distinct instrument design strategies, one passive and one active.

The first is the traditional way in which harsh environment instrumentation is developed, by designing instrumentation specifically suited for a given harsh environment and including various hardware alterations to passively isolate the instrument from specific environmental effects which distort measurement accuracy. Another method of mitigating these calibration drift effects is to actively monitor the instrument for calibration drift, and when it occurs, to update and adapt the known calibration curve to the properties of the instrument. With this method, if the instrument does undergo some material transition which affects the calibration, that effect can be actively accounted for. The difficulty in this strategy is knowing when this drift has occurred and how the instrument has changed.

2.1.1. Functional Design Concept Overview

Those skilled in the art will appreciate that it is important to determine if those effects which cannot be mitigated completely can be effectively compensated by estimating the onset and propagation of material transitions that ultimately lead to calibration drift. This estimate is calculated through the use of an instrument array consisting of four linked RTD sensor traces with well-characterized and predictable signal deterioration mechanisms. These traces are also utilized by another, fundamentally different, method of temperature measurement to provide a reference from which the accuracy of the RTD measurement can be determined and the material properties of the sensor traces can be monitored.

Various types of instrumentation have been evaluated to determine their applicability for this approach to drift mitigation. An ideal configuration has been developed herein, which has favorable characteristics for the specified target environment. The proposed instrument consists of a coupled platinum RTD and thin-film strain sensor, fabricated atop an alpha-alumina (sapphire) substrate base. Because both the RTD and thin-film strain sensor both utilize resistance measurements, they can share a single sensor trace. The method by which this resistance is sensitive to temperature is fundamentally different however, which is the key to determination of the onset of calibration drift.

Sapphire is an extremely durable material and is often utilized for high temperature instrumentation applications because it is very stable and does not corrode or otherwise deteriorate in harsh conditions. Although that is an excellent property to utilize, it isn't the key reason for choosing sapphire as an instrument base. Sapphire also has the unique property of demonstrating axially dependent thermal expansion. This property allows for a properly configured strain gauge to measure the temperature of the sapphire substrate by measuring the magnitude of the differential strain created by this anisotropic thermal expansion.

If a single instrument trace is used to measure both absolute resistance and differential resistance between two portions of the sensor trace, both of which can be correlated to temperature, then the variance between the two measurements can be used to determine the geometric and material condition of the sensor trace. If the sensor trace has changed in such a way that would cause the temperature calibration curve to drift away from the previously established standard, then an updated calibration standard can be estimated and applied.

To ensure the new calibration standard is accurate, the sensor trace must have a well characterized response to the material transitions which cause the drift to occur. This accuracy can be further assured if numerical methods can be used to reduce the measurement uncertainty, which requires many independent samples from a local area with similar environmental exposure. This can be accomplished by a deployment configuration which allows for high local instrument density, such as those demonstrated by MEMS instrumentation.

2.1.2 Identifying the Root Causes of RTD Calibration Drift

RTD calibration drift is caused by a variety of processes. These are mostly concerned with physical material transitions which occur inside or near the sensing element. This includes external stress on the sensing element from surrounding materials, variation of electrical conductivity due to structural material transitions, internal stress of the sensing element from grain formation or differential thermal expansion of constituent materials, material contamination of the sensing element via thermal diffusion or in the case of the proposed application, nuclear interactions resulting in material transmutation. Other effects, such as electromagnetic interference, electron pair production due to high energy particle interactions, and interactions with other parts of the measurement hardware, such as the sensor leads or resistance measurement package, can be neglected.

If the various processes which contribute to RTD calibration drift can be well-characterized and estimated, then the resulting signal can be corrected to remove the noise caused by these mechanisms and an accurate measure of temperature can be determined. A good place to start an investigation of RTD calibration drift mechanisms is the ITS-90 platinum resistance thermometry standard and its accompanying guide, presented by the BIPM. The effects described in the following sections are the primary drivers of calibration drift.

2.1.2.1 Chemical Transition of Materials (Oxidation)

A common source of calibration drift is the chemical reaction of the sensing element or substrate material with contaminates or free gas molecules in the sensing environment. The chemical reaction rate can be characterized by the partial pressure of the contaminate gas, the solid temperature of the material, and the orientation and size of grain structure within the material.

These effects are most common with free environmental oxygen, which is typically produced by the various insulating materials in the reactor cavity structure as they heat and produce off-gas from material restructuring, grain growth, etc. Some free oxygen is actually beneficial, as it may more readily react with other contaminates in the environment and form passivation oxides, but an overabundance can cause an oxidation reaction in platinum at high temperatures. These oxidation reactions are complex, with up to a dozen possible oxides and allotropes. The general effects can be summarized into groups of reaction progression for various temperature bands.

At temperatures up to approximately 350° C., a single surface layer of platinum oxide slowly forms, with the exact reaction rate being highly dependent on the partial pressure of free oxygen. This progression will saturate with a cumulative permanent room temperature calibration drift of approximately 1.0 to 2.0 mK for a standard 25 $\Omega$RTD.

For temperatures between approximately 350° C. and 600° C., the formation of oxide extends beyond the surface at a rate that is a function of the partial pressure of the free oxygen and the temperature. No apparent saturation limit is observed for this reaction, with typical effects including a permanent room temperature calibration drift of approximately 10 mK for a 25$\Omega$ high-temperature standard platinum resistance thermometer (HTSPRT) resistor. More significant effects are observed at long operating times in this environment.

At temperatures above 600° C., the platinum oxides will disassociate and the oxygen will typically migrate out of the platinum material lattice, returning the calibration drift offset to near zero in most situations, if a long dwelling period above 600° C. is utilized. Thus, it is vital that the time the instrument is exposed to temperatures between 350° C. and 600° C. is minimized, or if it does occur, the instrument should be either heated to above 600° C. for a period of time or the calibration reference should be adjusted to compensate for the oxide formation.

The preferred substrate for embodiments of the invention is alpha-alumina, which is a form of aluminum oxide. Thus, a certain amount of free aluminum and oxygen will be present near the platinum sensor trace and may cause some initial chemical deterioration. This is expected to reach an equilibrium point in which relatively rapid chemical reaction no longer take place, instead replaced by the slower process of thermal diffusion. The direct effects of chemical reactions outside of the oxidation described above can be assumed to be isolated to the initial annealing phase of the instrument fabrication sequence, and is not expected to occur during normal operation of the device.

2.1.2.2 Thermal Diffusion of Impurities

Any two materials which are placed in contact with one another at high temperature will exhibit some level of thermal diffusion. This process occurs when the thermal energy of the material is great enough to break the grain or lattice bonds that typically hold a material together. As these bonds are broken, the material sheds free atoms into the surrounding surfaces, which can either recombine in the origin material or may travel a short distance in to the adjacent material. Once this occurs, the free atoms are relatively unlikely to ever return to the origin material and will instead either combine to form a new substance within the adjacent material or may simply occupy a lattice void and create an interstitial defect.

As electrons flow through an ideal conductor, the electrical resistance is primarily driven by the scattering of electrons by the thermal motion of the conductor atoms. The introduction of impurities in the conductor will increase this scattering rate; and thus increase electrical resistance. This increase is not significantly dependent on temperature and corresponds to a calibration drift similar to that which is observed for oxidation reactions.

Both of the thermal diffusion outcomes described above will marginally change the electrical resistance of the instrument and must be accounted for in a similar way to the oxidation adjustments described in the previous section. The rate which is expected for this drift is highly dependent on the materials which insulate the platinum wire from the environment and the substrate chosen. Typical HTSPRT probes with a quartz insulation sleeve have been characterized as having a calibration drift rate of approximately 5 mK per 100 hours of exposure to temperatures above 450° C. for process monitoring environments. The specific rate of thermal diffusion for the platinum and sapphire material pairing can be estimated from literature on this topic, as this is the primary thermal diffusion mechanism which is expected to occur.

2.1.2.3 Strain and Hysteresis

Strain, which is defined as the elastic distortion of the atomic lattice of the platinum material which comprises the sensor element by applied stress, will alter the resistance of the platinum sensor trace until the strain is removed. Hysteresis is defined as the combination of strain with thermal energies great enough to alter the lattice bonds under strain and permanently plastically reform the crystal structure, which relieves the strain and causes a permanent alteration of the calibration reference. This permanent alternation must then be accounted for with a correction factor. Thus, strain is considered a dynamic factor and hysteresis is regarded as a static factor.

The rate at which the elastic deformation transitions into plastic deformation, a process similar to mechanical or thermal 'creep', is highly dependent on the thermal exposure of the instrument. For a high-temperature, isothermal, static measurement over long time periods, this transition rate has only a slight impact the resistance measurement, as the fundamental mechanism by which the resistance is changed is very similar for both strain and hysteresis. The lateral strain in the material serves to constrict the cross-sectional area of the sensor trace, increasing the resistance as a purely geometric function of Poisson's ratio for the material and the applied strain.

A key difference between the resistance change caused by strain and that caused by the geometric deformation of hysteresis is that the resistance change due to strain also includes an extra piezoresistive effect, which is more significant than the geometric effect for strain-induced resistance variation of platinum and most semiconductor materials. The resistance change for platinum due to the piezoresistive effect at low temperatures is more than twice the magnitude of the resistance change due to geometric affects. This difference is observed to be even greater for thin film geometries and mono-crystalline films. The piezoresistive effect is induced by the widening of the electron bandgap due to the distortion of the lattice bonds, which restricts electron mobility in the material. Like other bandgap-based effects, the influence of this effect is reduced with temperature, as thermal noise reaches an energy equivalent to the bandgap energy at high temperatures.

For RTD sensors, it is when transitioning between temperatures that this rate of change between strain and hysteresis is especially important, as elastic deformations will be variable and induced by differential thermal expansion, but any plastic deformations will be static and will remain in the material. This causes the so-called 'hysteresis effect', which generates a different resistance curve for each temperature transition in which the rate of temperature transition is faster than the rate of complete deformation transition and residual strain remains in the material.

The fundamental operating concept for embodiments of the invention can utilize a measurement of strain to provide an alternative measure of temperature, so the actual strain on the sensing element will be known and can be directly accounted for in-situ, via a similar adjustment of the reference calibration curve as was described in earlier sections concerning oxidation and impurity migration. The characterization of this resistance change as a function of measurement temperature and thermal exposure is important to determine the maximum temperature transition rate as well as the permanent correction factors which will need to be applied to the calibration reference curve.

It should be noted that this approach to measuring strain at high temperatures is fundamentally opposite of the typical approach for strain measurement. In this approach, the piezoresistive portion of the resistance change is expected to slowly diminish over time and geometric transition is encouraged, which will offset the strain calibration curve permanently as the elastic deformations in the material lattice are slowly replaced with permanent plastic deformation, bringing the expected resistance change into alignment with a purely geometric approximation. The typical approach to measuring strain seeks to suppress this hysteresis effect and maximize the piezoresistive effect, gaining higher sensitivity and repeatability by preserving the material lattice and preventing plastic deformations.

For RTDs which utilize an AC or fast-switching DC measurement mode, this effect can be significant. As each measurement cycle heats the element slightly, allowing it cool between measurements, this transition between temporary and permanent deformation accounts for approximately 0.1 mK to 1.8 mK of calibration drift from peak-to-peak. This effect can be mitigated by slowing the measurement cycle rate or by limiting the measurement current to reduce self-heating. However, this would also reduce the data density and accuracy obtained by the signal processing electronics, so a trade-off between these effects must be evaluated.

2.1.2.4 Vacancies and Defects

Vacancies and defects in the material lattice of the resistance sensor serve to increase the measurement resistance in the same manner as thermal diffusion of impurities, in that they create more electron scattering at the defect location. These vacancies and defects are primarily created by two distinct processes, described as either thermal or mechanical.

At temperatures above approximately 450° C., the thermal energy of the constituent atoms is great enough to break lattice bonds and cause atomic displacement of the atom, resulting in a lattice vacancy, interstitial defect, or plane dislocation defects. The rate of this effect increases exponentially with temperature and can create multi-atom defects at high temperatures, as multiple atoms are dislocated and form a new lattice which is offset from the original lattice, essentially creating a new 'grain' in the material. This effect is on the order of tens of mK at 962° C., which is a common reference calibration temperature.

The vacancy creation rate is balanced by the annealing rate, which is when the displaced atoms return to their original location, again due to the thermal energies driving lattice bond re-formation. These two rates will reach an equilibrium at a given temperature and will not result in permanent alteration of the calibration reference if the temperature transitions are slow. If platinum is suddenly cooled, by quenching for example, these vacancies do not have an opportunity to anneal, and will be permanently included in the material lattice, causing a permanent increase in resistance for the sensor. To avoid this effect, the maximum cooling rate for platinum is recommended to be no more than 50° C. per hour for temperatures above 500° C. Once the 500° C. threshold is reached, the sensor can be cooled more rapidly to avoid undue oxidation, as vacancies are less prevalent in this temperature range.

Mechanical defects are similar to hysteresis in that the material lattice is plastically deformed, in this case by mechanical impact or vibration, which causes the calibration reference curve to shift. These effects are additive in nature, with every impact raising the sensor resistance marginally. These defects can be annealed to return the sensor to its original calibration reference; however, a large number of defects will require proportionally longer exposure times at high thermal energies to re-form the surrounding lattice bonds, which will return to their most energetically favorable formation. Very large mechanical defects cannot be practically annealed because the material lattice will have shifted beyond the previous 'ground state' or fully annealed formation, and a different formation will be formed once all lattice bonds are fully annealed and reach their most energetically favorable state. If this new formation has significantly different geometry when compared to the original formation, the alteration to resistance would be permanent.

Mechanical defects are common for newly fabricated sensors and are characterized by internal stress in the sensor material. These defects must be annealed to return the material lattice of the sensor to the 'ground' or stress-free state, from which the most accurate and stable calibration curve can be developed.

2.1.2.5 Thin Film Effects on Electron Mobility (Electron Mean-Free-Path)

In addition to the previous effects reviewed in the ITS-90 standard, additional parameters have been identified by researchers investigating the impact of annealing on the thermal coefficient of resistance (TCR) for platinum thin films. Among these are the effects which are assumed to be more prominent in thin film devices, such as that which is proposed in this investigation. These effects include the density of grain boundaries in a material as well as variation in current transport density, which results in a non-linear scaling of electron mobility as the mean-free-path length nears the film thickness.

It is generally observed that longer annealing times will lower the thermal coefficient of resistance due to grain growth. For alumina substrate, this includes grain re-orientation, as growth in the (111) crystal lattice orientation is preferred due to the epitaxial material boundary shape of the alumina substrate. As the grains are re-oriented and grow in size, electron mobility, measured by mean-free-path, tends to increase as the grain boundary density becomes lower. This effect is generally well understood but characterization is heavily dependent on the materials utilized. If this mean-free-path nears a magnitude which is equivalent to the film thickness, additional constraint on electron mobility results in a non-linear reduction in TCR for additional annealing time, even as grain size continues to grow. This is only a concern for very thin films (nanometer scale), such as those used for transistor fabrication; thus, this effect is only marginally applicable for embodiments of the invention.

2.1.3 Applicable Calibration Drift Mitigation Techniques

If the effects explored in the previous section can be accurately characterized in the target environment, calibration reference adjustment is simply a matter of applying the right factors as a function of instrument thermal exposure. Mitigation should be approached in the two ways previously described, both passively by reducing the impact of the calibration drift effect, and actively by measuring the onset and magnitude of the drift effect so that it can be compensated for. The following strategies can be utilized to mitigate each of the effects previously described.

2.1.3.1 Sapphire Substrate Structural and Chemical Durability

The material chosen for the substrate and thin protective film surrounding the sensor can be alpha-phase, mono-crystalline alumina, also called sapphire, and has a range of desirable characteristics for the intended application and environment.

A high Young's modulus indicates the material will resist strain due to the impact of external forces, such as the point loading of compression from surrounding fuel pebbles. The mono-crystalline structure of the material provides consistent thermal expansion and heat conductance characteristics. Sapphire has a high lattice bond energy, meaning it requires relatively high thermal energy to prompt material transitions such as vacancy formation or off-gassing of oxygen. The electrical insulation characteristics are also very stable, even at high temperatures, reducing the amount of leakage current expected to flow through the insulator.

2.1.3.2 Platinum Corrosion Resistance and Thermal Stability

The material chosen for the resistive trace on the instrument is platinum, which can be an ideal material choice for high temperature instrumentation due to its resistance to corrosion and high thermal stability. Particular interest in the material compatibility between alumina, aluminum, and oxygen are of a concern, as these materials will be readily available as thermal diffusion contaminants due to the close proximity of the platinum sensing element and the surrounding substrate.

Alumina itself does not thermally diffuse into platinum as a coherent molecule, but oxygen and aluminum do disassociate at the material boundary and may thermally diffuse as free atoms. While platinum does form an oxide layer at high temperatures, this layer disassociates readily and does not contribute to long term calibration drift at temperatures above ~600° C. Aluminum is the primary concern, as it will readily diffuse through platinum if the concentration of free atoms at the material boundary is large. One method of preventing this is to allow a small amount of oxide formation on the platinum surface, which acts as a passivation layer and preferentially reacts with the free aluminum atoms to re-form alumina, rather than allowing the aluminum to pass further into the material.

Platinum will form platinum silicate when paired with silicon-based materials, such as silicon carbide, at high temperatures. This is a primary difficulty with platinum-on-silicon instruments and will be avoided in this case by utilizing alumina instead of silicon or silicon carbide as a substrate material.

Two key concerns for the use of platinum are the bonding strength to the sapphire substrate and the physical material limitations of pure platinum. Bonding strength is primarily a function of similarity in crystalline epitaxial structure, which is a good match between platinum and alumina. If the bonding strength needs to be increased, a metallization layer of chromium, zirconium, or molybdenum can be used as an adhesion layer between the two materials. This interstitial material can introduce additional considerations for effects such as thermal diffusion, so they will not be considered unless they prove to be a necessary addition.

Concerns regarding the material properties of pure platinum can be addressed by adding a small amount of molybdenum, rhodium, or rhenium to produce a platinum alloy with considerably higher melting temperature. Again, the alloying of these materials creates additional complexity in predicting the thermal response of the instrument, due to additional thermal diffusion between the adjacent materials.

Thus, these alloying elements will also not be considered unless deemed necessary for the function of the instrument.

2.1.3.3 The Benefits of Utilizing a MEMS Instrument Array

A key component of embodiments of the invention is the use of an instrument array. MEMS fabrication techniques are uniquely suited to the fabrication of sensors in an array formation because many sensors can be fabricated with batch processing. The various fabrication methods mentioned previously and expanded upon later in this chapter are sequential, layered techniques that can be easily scaled across large areas. In addition, the material geometry for each sensor in a given layer can be easily varied, meaning that a large number of sensors with unique, precise geometry and material characteristics can be fabricated at very low cost. This high confidence in the final sensor parameters coupled with the low cost of variation and ease of scaling to high volume manufacturing makes the approach of utilizing MEMS instrument arrays a key component of the novelty of the presented research.

Because the MEMS fabrication process enables the use of micro-scale sensor arrays, a key assumption can be made regarding the environmental exposure of each sensor in the array. Due to the close proximity of the proposed array, it can be assumed that the temperature of each sensor is identical and the possible radiation exposure for each sensor is likewise very similar in magnitude. This allows for varied parameters of these sensors to be isolated as the primary motivator of differential measurements between the sensors, and allows for the fundamental capability of leveraging this differential response to estimate environmental exposure, which then enables an estimate of sensor drift to be made.

The differential response to environmental conditions can be realized in several unique ways. One example is the inclusion of a thermal diffusion agent in varied concentrations on the upper surface of the platinum trace, then comparing the differential resistance as the agent diffuses through the platinum material would allow for a determination of thermal exposure for the instrument. In this case, a differential strain measurement is utilized to provide a functionally independent measurement of sensor resistance, which allows the estimation of thermal exposure to be made based on the comparison of the RTD measurement against the strain derived temperature.

Another key benefit of an array sensor deployment configuration is that sensors in close proximity can be cross-correlated to reduce the uncertainty in measurement accuracy. If two sets of sensor arrays are mounted to the same pebble, and it is known that a single pebble will only undergo a limited thermal gradient due to heat conduction of the material and bounds on the expected environmental profile, then the measurements from these two arrays must lie within a specified range of each other. This allows for the standard error to be analyzed with additional boundary conditions, increasing the overall confidence in measurement when applied across an entire instrumentation system.

The benefits of instrument arrays are significant, but a number of challenges are also created. Although the long-term application for the instrumentation approach presented is assumed to utilize wireless signal transmission, the practical development of this approach will utilize a wired connection initially. Having a large number of sensors in an array creates significant challenges regarding the signal wire connections and routing of the signal wires out of the harsh environment the sensor is exposed to. It is assumed that multi-conductor, mineral insulated wire will be utilized as the signal lead wire in this case. Each sensor will need at least four terminal connection pads, each of which is around a millimeter in diameter. This allows the mineral insulated wire to be bonded, via silver soldering or similar high temperature brazing technique, to the pad after the sensor is fabricated and the batch processed wafer is diced into individual units. Even a small sensor array will thus require a large area just for termination connections and cable routing, relative to the characteristic dimension of the sensor, which is the size of the sensor trace in this case.

2.2 Exemplary MEMS Thermal Sensor Design

In this section, the design decisions which can determine the sensor geometry and material selection are examined and an exemplary instrument design for embodiments of the invention is defined. This process begins with a clear description of the design targets, philosophy, and key equations; followed by a summary of the instrument materials and geometry selection process. The exemplary design is then described in detail and key parameters are identified based on their functional impact. Finally, the sensitivity of these key parameters is investigated to determine the allowable variation for manufacturing processes.

2.2.1 Primary Design Target Parameters

The goals for the exemplary design are twofold. The first and primary goal is to create a functional sensor array that can accurately measure the temperature in the target environment. The second goal is to isolate the mechanisms of calibration drift so that thermal exposure becomes the primary, well-characterized means of measurement drift.

Creation of a functional sensor array can be achieved simply by creating a sensor geometry that is comprised of pure elemental platinum and has an ultimate resistance in the range of 25Ω at the TPW (273.16 K or 0.01° C.). This range is chosen so that SPRT calibration interpolation standards can be utilized. The sensor portion of the instrument is functionally complete by providing stable termination points for the connection of power and signal analysis components. Isolating the various causes of instrumentation drift is a more difficult endeavor, as a range of effects can cause the resistance to temperature relationship to be unstable, as explored in the previous section.

For HTSPRTs, a TPW resistance from 0.2Ω to 2.5Ω is commonly used, with a measuring current of 5 mA to 10 mA with wire diameter of 0.3 to 0.5 mm. This lower initial resistance and larger measurement current are used to compensate for the relatively large leakage current observed for mica insulation, which is used for construction of HTSPRTs used for process monitoring. The selection of sapphire as a substrate removes this requirement, as it does not exhibit the same large leakage current at high temperatures. To ensure low power requirements and high measurement accuracy by avoiding self-heating of the sensor wire, a 25Ω initial resistance can be used unless thermal leakage is demonstrated to be a significant contributor of measurement error.

2.2.1.1 HTGR Environmental Parameter Review

Figure 2:
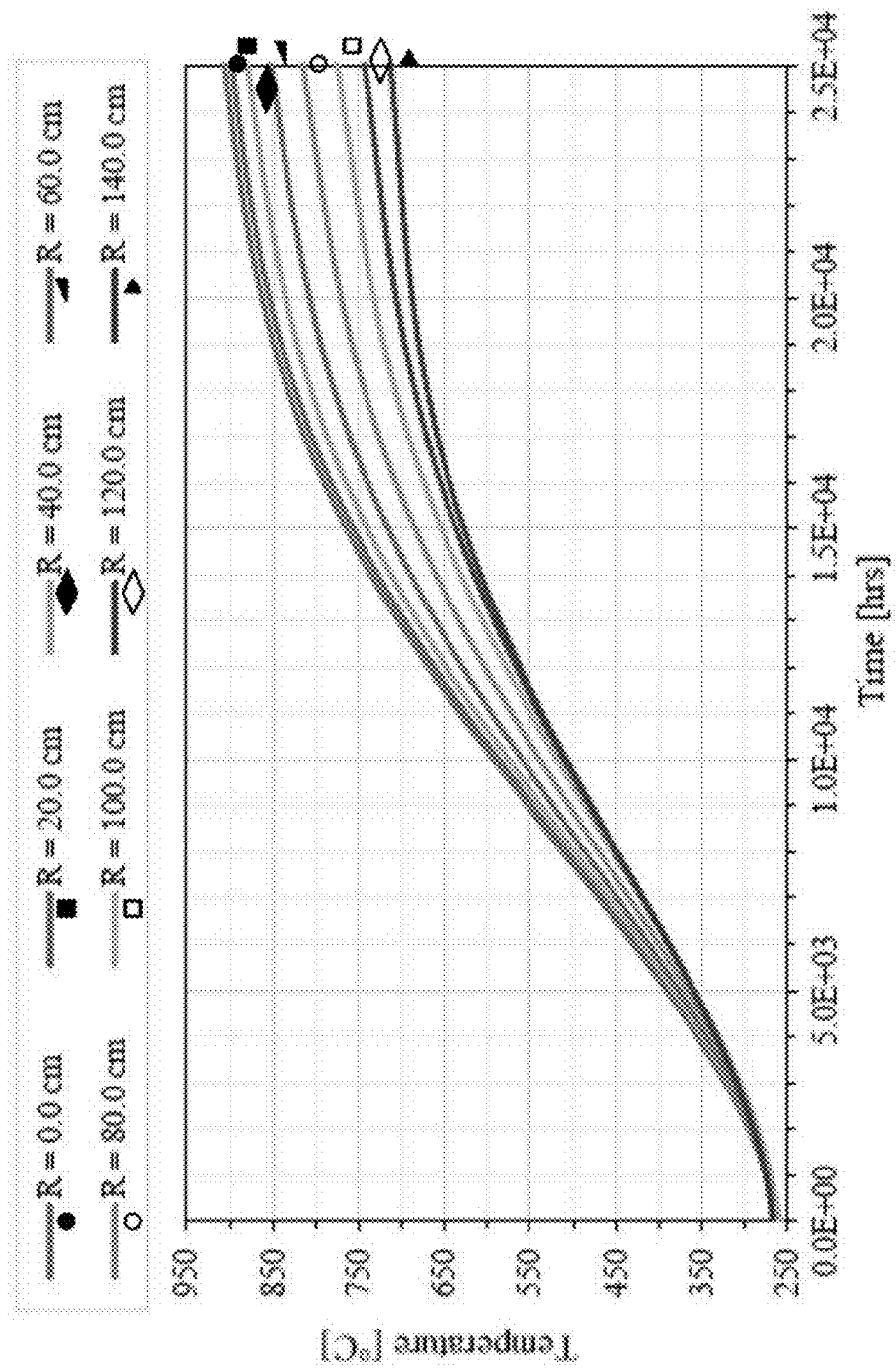
FIG. 2 is plot of thermal exposure for pebbles with varying initial radial position (3-15)

As described in the previous chapter, the target environment for instrument deployment will include a range of temperatures depending on the deployment location within the reactor core. Thus, we have an expected core-wide temperature variability described by the thermal exposure profile identified in FIG. 2. This predicts an operational exposure of 25,368 hours across a range of approximately 250° C. to 910° C. for steady state operation, which will be the functional environment for the proposed instrumentation.

Axial coolant pressure drop is described by the primary thermal hydraulic simulation reference as being approximately 80 kPa across the core height, applying this 80 kPa gradient to the design coolant pressure of 7.0 MPa indicates a height dependent environmental pressure of between 6.92 MPa and 7.0 MPa. Mechanical pressure from adjacent fuel pebbles will be assumed to be isolated by the sensor mounting and will not be considered outside of the analysis done for the pebble migration study in the previous chapter. The environment being considered will include pure helium coolant, with carbon freely available at the instrument surface due to off-gassing of carbon oxides and free carbon dust which is expected in the operating environment.

Other environmental parameters for a functional reactor would be the expected radiological exposure for embodiments of the invention. However, it should be recalled that those effects are not being considered in this case, as the initial use case is for thermal hydraulic experimental facilities only. In addition, the effects of electromagnetic field noise typically created by the high voltage heating system of such facilities will not be considered here, as it is highly variable and dependent on the specific type of heating system utilized for the test facility.

Considerations of effects on signal transmission wires, external power and signal analysis equipment, and all other components external to of the sensor assembly are considered stable and not analyzed for response to the assumed environment.

2.2.1.2 Target Instrument Accuracy

The targeted accuracy will be equivalent to what is currently implemented for contemporary HTGR thermal hydraulic instrumentation systems. The thermocouples utilized for the HTR-10 instrumentation system are K-type, class 1E thermocouples, with an expected accuracy of ±1.5° C. or ±0.4% of measured temperature, whichever is greater. Thus, this can be the minimum acceptable accuracy variation for the thermal exposure range specified.

2.2.1.3 Target Instrument Response Rate and Measurement Frequency

The instrument response rate is highly dependent on the thermal insulation properties of the shielding layer of sapphire which protects the sensitive resistive element from environmental exposure. A trade off should be evaluated between the level of protection offered by this layer against the impact on instrument response rate.

As a reference, the target will again be set to provide an equivalent performance to what is typically used for contemporary HTGR instrumentation systems. The response rate for the K-type thermocouples utilized in the HTR-10 is a function of the insulation parameters of the magnesium oxide powder which protected the probe tip as well as the probe construction, grounded or ungrounded.

For an ungrounded probe diameter of 3.17 mm, it can be assumed that the layer of magnesium oxide is no greater than 1 mm in thickness when accounting for the diameter of the thermocouple wire and stainless-steel sheath. Given that the response time is a function of the heat transfer properties of measurement media and environmental temperature, a conservative estimate would be in the range of 2.5 seconds for an ungrounded probe to 0.5 seconds for a grounded probe. Thus, a target of 0.5 seconds can be selected for response time of the developed sensor.

The measurement frequency of an RTD sensor is limited by the self-heating of the resistance trace during measurement. If a square wave, 2.0 Hz, DC excitation current profile with a variable up-time is used for measurement, this would result in a measurement frequency equivalent to the targeted response rate of 0.5 seconds. Thus, 2.0 Hz can be the targeted instrument measurement frequency.

2.2.1.4 Target Instrument Durability

Initial exemplary design can assume an environmental exposure equivalent to a single pass through the pebble bed core fuel recirculation system. Thus, the target instrument durability target can be defined as maintaining the target accuracy throughout this single-pass cycle 2.2.2 Primary Design Philosophy and Key Equations The design philosophy utilized in the development of the exemplary instrument arrays are focused on isolation of the effects of thermal exposure which influence calibration drift for RTD sensors. The exemplary design of each sensor and each array package should not be overly complex, as the geometry is somewhat limited by the fabrication techniques selected. Thus, a simple geometry is chosen and unnecessary complexity in features is avoided when possible.

Some features which have been demonstrated to be successful in literature can be employed with embodiments of the invention such as selection of the meander type sensing element and the geometry of the vias and termination pads. Geometric complexity can be isolated to two layers, a top layer which faces away from the mock fuel pebble and a bottom layer which routes the traces to convenient locations for connection of the meander sensing element above to the lower termination pads required to connect the signal wire leads. Between these two layers, a number of channels (called vias) can be utilized to route connections through the sapphire substrate.

The thickness of each insulating layer and the of the sensor circuit components can be selected from various successful fabrication operations described in literature, then adjustments are made to ensure compliance with the design targets described previously. The sensing element geometry is motivated by the desire to achieve a sensor resistance of 25Ω, which is an industry standard for SPRT elements. The substrate thickness is motivated by commercial availability, with 725 µm (±25 µm) 1120 (A-plane) sapphire wafers in 100 mm and 150 mm diameters being widely available from industrial suppliers.

2.2.2.1 Fundamental Equations for Circuit Analysis and Design

A fundamental equation for design of a resistance-based instrument is defined in Equation 2-1. It describes the relation of the electrical resistance (R,Ω) to the resistivity (ρ,Ω m), length (L,m), and cross-sectional area ($A_c$,m$^2$) of a conductor. Note that the resistivity is a function of temperature, with the triple point of water (TPW, 297.15 K) being chosen as the reference temperature for selection of the generic value.

$$R = \frac{\rho L}{A_c} \qquad \text{Eq. 2-1}$$

Most equations useful for electronic design are derived from Ohm's Law, defined in Equation 2-2, which relates the resistance (R,Ω), current (I,A), and electric potential or voltage (V,V). These factors are related to power (P,W) as described in Equation 2-3.

$$V = IR \qquad \text{Eq. 2-2}$$

$$P = I^2 R \qquad \text{Eq. 2-3}$$

Ohm's Law is extended to circuit analysis via Kirchhoff's Current and Voltage Laws, which state that the sum of currents entering and exiting a circuit node must be equal and that voltage increases and decreases must be equal in a closed loop circuit, respectively.

The equivalent resistance of resistors in series or parallel, defined in Equations 2-4 and 2-5, is a matter of adding either the resistance value or the inverse resistance value for each component.

$$R_{Series} = R_1 + R_2 + R_3 + \ldots + R_N \qquad \text{Eq. 2-4}$$

$$\frac{1}{R_{Parallel}} = \frac{1}{R_1} + \frac{1}{R_2} + \frac{1}{R_3} + \ldots + \frac{1}{R_N} \qquad \text{Eq. 2-5}$$

Extending this circuit analysis further to the specific case of the WSB circuit as applied to strain gauges, Equation 2-6 defines the ratio of change in resistance ($\Delta R, \Omega$) over the initial resistance ($R_0, \Omega$) as equivalent to the product of strain gauge factor (k) and strain ($\varepsilon$). The strain is defined in Equation 2-7 as being equivalent to the ratio of a change in a spatial dimension, such as length ($\Delta L$,m), over the original dimension ($L_0$,m), or as the ratio of stress ($\sigma$,Nm2/) to the Young's modulus (E,Nm2/) of the material.

$$\frac{\Delta R}{R_0} = k\varepsilon \qquad \text{Eq. 2-6}$$

$$\varepsilon = \frac{\Delta L}{L_0} = \frac{\sigma}{E} \qquad \text{Eq. 2-7}$$

The strain gauge factor is commonly assumed to be equal to 2.0 for most thin-film metallic strain gauges and is typically uniquely defined for each individual strain gauge during calibration. The theoretical basis for gauge factor is described in Equation 2-8, which relates the gauge factor (k) to the Poisson's ratio (v) for a given material, the strain ($\varepsilon$) and the piezoresistive effect, which is defined as the ratio of change of resistivity ($\Delta \rho, \Omega$ m) over the initial resistivity ($\rho, \Omega$ m), per unit of strain.

$$k = \frac{\Delta R/R_0}{\Delta L/L_0} = 1 + 2v + \frac{\Delta \rho/\rho}{\varepsilon} \qquad \text{Eq. 2-8}$$

Fundamental to the analysis of RTD elements is the effect of temperature on resistance. This relation is a function of the temperature offset (T,° C.) from an initial temperature (T0,° C.) and the temperature coefficient of resistivity (TCR or $\alpha$,° C.−1) and is defined by Equation 2-9. It should be noted that TCR also varies with temperature.

$$R(T) = R_0[1 + \alpha(T - T_0)] \qquad \text{Eq. 2-9}$$

Figure 3:
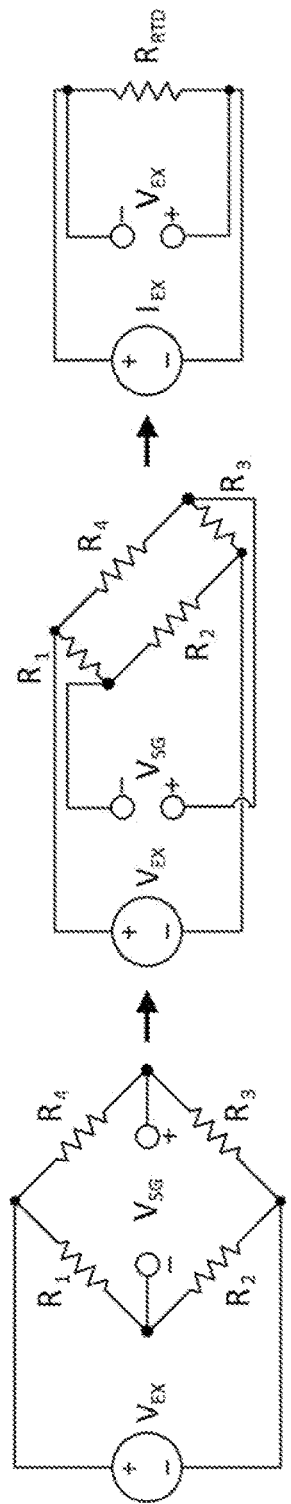
FIG. 3 shows exemplary WSB circuit compared to Ohm measurement circuit.

As a reminder of the specific circuit configuration being proposed for this hybrid resistance instrument, an example of the WSB and Ohm measurement circuits is depicted in FIG. 3.

A number of standardized equations exist for calculating the parameters of the 4-wire Ohm measurement and WSB circuits, all of which are derived from Ohm's and Kirchhoff's Laws. These include is a simplified equation for the bridge voltage ($V_{SG}$,V) as a function of the four resistance values ($R_{1-4}, \Omega$) which comprise the four balanced legs of the WSB circuit, and the bridge excitation voltage ($V_{EX}$,V) defined in Equation 2-10. A similar relation can be derived for the expected voltage from the 4-wire Ohm measurement, with the measured voltage ($V_{RTD}$,V) as a function of the four equal resistance values which comprise the sensor element and the excitation current ($I_{EX}$,A), defined in Equation 2-11.

$$V_{SG} = \left[\frac{R_3}{R_3 + R_4} - \frac{R_2}{R_1 + R_2}\right] V_{EX} \qquad \text{Eq. 2-10}$$

$$V_{RTD} = I_{EX} R_{RTD} \qquad \text{Eq. 2-11}$$

These equations can be simplified for the exemplary hybrid instrument, as the resistance of the RTD is equivalent to the combined resistance of the WSB, as long as the two halves of the bridge remain balanced. This simplification is defined in Equations 2-12 and 2-13. At the calibration basis point of TPW, all legs of the WSB will be equal because this is also the assumed zero strain point. Thus, at this point the RTD resistance is equivalent to any one of the bridge resistances, as defined in Equation 2-14.

$$V_{RTD} = V_{EX} \qquad \text{Eq. 2-12}$$

$$\frac{1}{R_{RTD}} = \frac{1}{R_1 + R_2} + \frac{1}{R_3 + R_4} \qquad \text{Eq. 2-13}$$

$$R_{RTD@TPW} = R_1 = R_2 = R_3 = R_4 \qquad \text{Eq. 2-14}$$

2.2.3 Summary of the Instrument Development Process

In this section, the development process is reviewed and key decisions concerning the selection of instrument materials and geometry are described in detail. The motivations for the design choices are made clear and support is provided through contextual references to the literature used to develop the initial sensor parameters. Any design decisions not detailed in this section have been made according to the principles previously presented.

2.2.3.1 Sensor Material Selection

MEMS instruments are often described as "systems of materials" due to the impact of inherent material properties at the spatial scales being considered for instrument design. Large temperature gradients and harsh environmental conditions drive material transitions which can significantly alter instrument calibration and reduce signal quality. Thus, the selection of materials should be carefully considered. Materials must be selected for three primary functional classes; a substrate, sensing material, and a protective shielding material. An additional three functional classes are also considered; a thermal diffusion material, a thermal conduction material (heat spreader), and a metallization material (adhesion promoter). Several materials are considered for each of these applications in the following section and the most desirable materials are selected for initial design efforts.

It is vital that the materials chosen for sensor design share similar material properties, such as coefficient of thermal expansion (CTE) and epitaxial crystal structure. This prevents internal stress from being created at material boundaries, which reduces unwanted strain or hysteresis effects, and promotes good bonding at material boundaries. In addition to these structural inter-material concerns, the materials chosen should also be corrosion resistant, have stable grain formation at the expected operating temperatures, and resist unintended thermal diffusion across material barriers. The materials must be readily available at high purity and be capable of being manipulated using common MEMS fabrication techniques.

Metallic thin film RTD sensors commonly feature a platinum, nickel, silver, or gold thin film sensing element deposited on an insulating substrate comprised of silicon dioxide, alumina, quartz (fused silica), sapphire, titanium dioxide, tungsten oxide, or various other refractory insulating materials. An outer corrosion inhibitor or shielding layer is typically used to seal the instrument and prevent intrusion of contaminants or corrosive elements. The choice of materials is affected by the environment of deployment and the expected interaction between the sensing material, the selected substrate, and the shielding barrier.

Additional interstitial material may be used to promote mechanical adhesion of the sensing material to the substrate, to provide an auxiliary function, such as grain growth inhibition, through the addition of a thermal diffusion agent, or to ensure isothermal operation though the addition of a high thermal conductance layer near the sensing element. These secondary materials can introduce additional variables that must be accounted for when analyzing sensor performance and may cause significant reliability issues for operation at high temperatures if their thermal and mechanical response is not well characterized. To avoid this, additional materials should only be added if absolutely necessary and a preference for simple geometry and fewer material interfaces is advised.

If the instrument is incorporated into a manufacturing process which already utilizes a silicon wafer as the substrate material, such as for embedded sensors in integrated circuit electronics, then a thin insulating layer of silicon dioxide is typically utilized to create a suitable foundation for a platinum sensing element to be deposited on top of. Silicon dioxide has two primary drawbacks however, the CTE difference in these materials is significant and platinum does not adhere well to the silicon dioxide substrate at high temperatures, requiring the use of an intermediate material to aid adhesion. For this reason, silicon dioxide will not be considered for this investigation.

More exotic and durable substrate materials, such as silicon carbide, titanium dioxide and tungsten oxides, have been investigated for applicability to high temperature environments, with some promising results. All of these materials demonstrate excellent resistance to thermal diffusion and corrosive chemical attack, but exhibit significant hysteresis effects due to the large differential thermal expansion between the two materials and typical metallic sensing materials, such as platinum. Adhesion at material boundaries is also poor, requiring interstitial materials to be used. Silicon carbide in particular has shown promising results in applications as a ceramic thin film thermocouple when coupled with platinum. However, silicon carbide reacts adversely with platinum if thermal diffusion barriers are not used. Platinum silicide is formed if no oxidized passivation layer is present to contain silicon migration at high temperatures. Thus, these materials can also be excluded as possible substrate materials.

Thermal sensors for high temperature or harsh environments typically utilize a metallic sensing element comprised of platinum or nickel alloys due to their high melting temperature and good resistance to corrosion. Common choices for the insulating substrate include alumina or silicon dioxide, both of which have high melting temperatures and very stable material structure across a wide temperature range. Platinum and alumina have similar coefficients of thermal expansion (CTE in Table 4-1), and are commonly paired together for this reason.

Sapphire, which is the monocrystalline form of alumina, has also been recently investigated as a high temperature substrate for RTD sensors and demonstrates some beneficial properties when combined with platinum specifically, as they share the same epitaxial crystalline structure. The difference in CTE between mono- and poly-crystalline alumina may cause increased hysteresis effects or adhesion failure for operation across large temperature ranges. Initial results published in 2019 by Wang et. al were very promising for high temperature applications. An additional consideration is that sapphire CTE varies significantly with temperature; however, in the range of ~900° C., the CTE of sapphire and platinum are relatively closely matched.

Sapphire has been utilized for MEMS fabrication processes for many years, as it is the primary substrate utilized in silicon-on-sapphire (SoS) CMOS electronics for harsh environments. This approach is fundamentally enabled by the identical crystal epitaxy spacing of silicon and sapphire, when cut on the R-plane, as described in FIG. 4. Silicon-on-sapphire construction utilizes sapphire as a substrate and insulator for the addition of doped silicon thin films to form semiconductor components, such as piezoresistive pressure sensors, which have extremely high chemical corrosion resistance.

Figure 4:
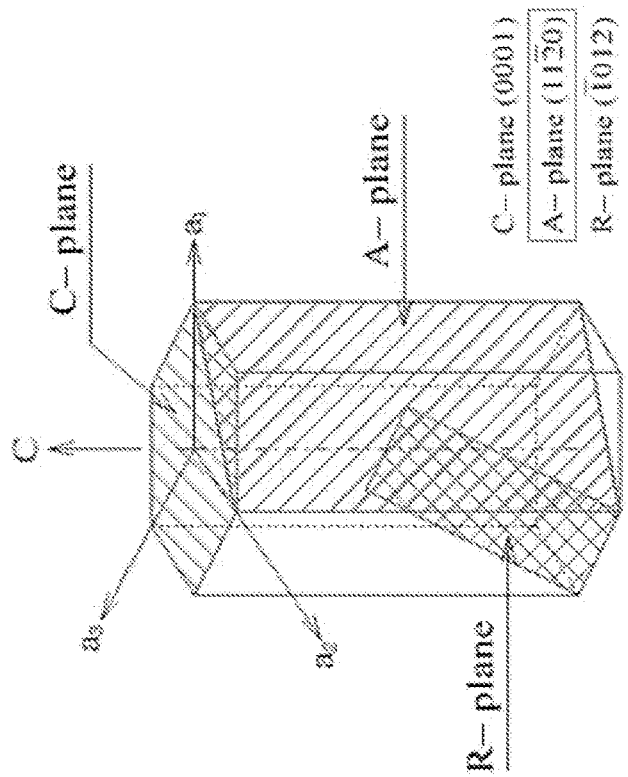
FIG. 4 shows structure and lattice planes of sapphire with A-plane highlighted.
Figure 5:
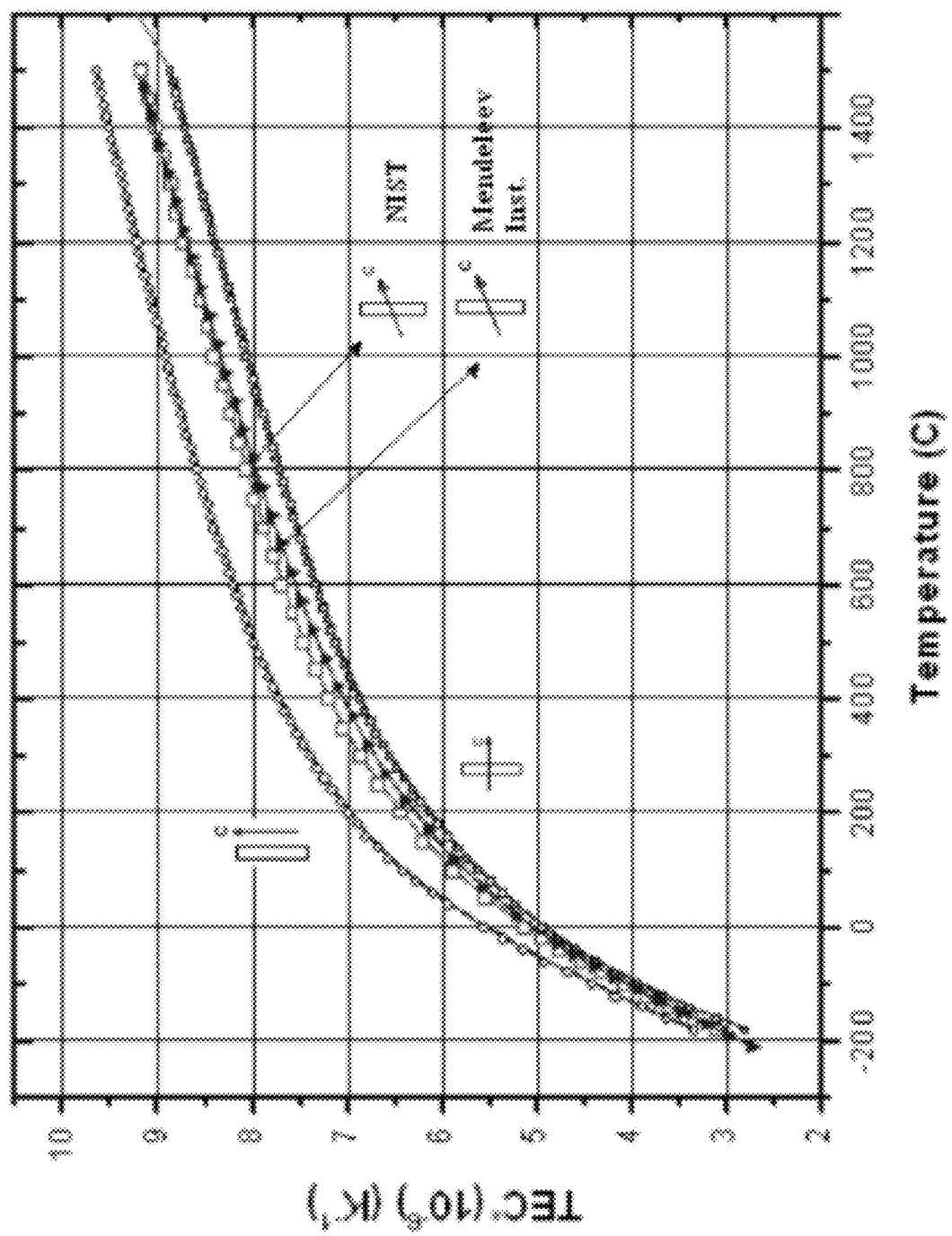
FIG. 5 shows temperature dependent CTE for sapphire parallel and perpendicular to the C-axis.

When cut on the A-plane (1120), also depicted in FIG. 4, sapphire exhibits an anisotropic coefficient of thermal expansion. Although this differential expansion rate is marginal at very low temperatures, it amounts to approximately 7.5% differential CTE at the targeted operating range for high temperature instrumentation, as depicted in FIG. 5. This creates the opportunity to utilize this substrate as an additional measure of temperature, if the differential thermal expansion can be measured accurately at high temperature. A common way that this is done is through the use of strain gauges oriented along perpendicular axis.

High temperature strain gauges typically utilize nickel or platinum alloys, although semiconductor strain gauges are typically preferred for harsh environments due to their high gauge factors, which is linked to their coherent lattice structure. If the piezoresistive contribution of the gauge factor is ignored, and the strain gauge is operated assuming a purely geometric gauge factor, as is expected at very high temperatures, then a wide range of metals provide similar response and the primary design criteria is shifted to preference for highly corrosion resistant materials.

Alternative sensing materials composed of monocrystalline non-oxide ceramic materials, such as doped silicon carbide, have also been investigated. Although these materials demonstrate good durability and very low hysteresis effects in harsh environments, the non-linear resistance-to-temperature profile exhibited by many of these materials results in poor instrument accuracy and low measurement precision. In addition, the difficulty of developing and preserving a mono-crystalline structure for operation in harsh environments requires specialized fabrication considerations. Research in this area will likely be possible in the future, but the current state of development is not mature enough for the limited scope of this project.

As an initial choice of materials to create an exemplary instrument sensitive to both temperature and axially dependent differential thermal expansion, platinum and sapphire are selected. Pure platinum exhibits a linear TCR across a wide temperature range, is highly corrosion resistant, has a massive amount of high-quality reference and characterization material available, and has good performance demonstrated at high temperatures due to the use of pure platinum for platinum thermocouples and RTDs for definition of calibration standards. Sapphire is chosen as the substrate for high mechanical and chemical stability, ease of manufacture, high epitaxial and thermal compatibility with platinum, and most importantly, the property of axially dependent differential thermal expansion. In addition to this, studies of the high temperature characteristics have indicated that polycrystalline alumina does not thermally diffuse into platinum at temperatures below 900° C. Sapphire is expected to have a slightly higher barrier for thermal diffusion, with some investigations indicating a threshold of 1,100° C. or more. Material properties are listed in Table 2-1 below for comparison to materials with similar functional applicability and later reference.

The final choice of primary material is the shielding or capping barrier which is deposited on top of the sensor element to protect it from the surrounding environment. To keep material interfaces as uniform as possible, the obvious choice for this is alumina. The capping layer would ideally be thermally deposited so that the crystal lattice is continuous. Alternately, poly-crystalline alumina could also be deposited via a sputtering system, although the expected performance in that case is expected to be slightly worse than if a mono-crystalline capping layer is utilized.

| Material | Resistivity ($\rho$) [n$\Omega$ m] at TPW | TCR ($\alpha$) [$K^{-1}$] | CTE [$10^{-6}$/K] |
|---|---|---|---|
| Platinum (Pt) | 97.65 | 0.00393 | 8.90 |
| Rhodium (Rh) | 43.30 | 0.00445 | 8.35 |
| Chromium (Cr) | 125.0 | 0.00301 | 4.90 |
| Alumina ($Al_3O_2$) | $1.0 \times 10^{25}$ | — | 8.40 |
| Sapphire ($\alpha$-$Al_2O_3$) | $1.0 \times 10^{25}$ | — | 9.03-8.31 * |
| Silicon (Si) | $2.3 \times 10^{12}$ | — | 2.60 |
| Silicon Dioxide ($SiO_2$) | $1.0 \times 10^{25}$ | — | 0.60 |
| Silicon Carbide (SiC) | $2.3 \times 10^{12}$ | — | 4.00 |

* Note:
Sapphire CTE varies with optical axis alignment and temperature (at ~1,270 K)

In addition to the platinum and alumina materials chosen for the sensing material and substrate, additional secondary materials can be selected for the optional inclusion of metallization, thermal diffusion, and thermal conducting layers. As stated previously, these additional materials should not be included in the sensor unless necessary, as they can increase the complexity of analysis and will likely contribute to failure mechanisms associated with thermal diffusion of the additional material into the platinum sensing material.

One of the concerns identified in literature for the deposition of platinum onto alumina substrate is poor adhesion of the metal to the substrate, leading to delamination and the sensor material pulling away from the substrate. These prior works were primarily focused on the utilization of poly-crystalline alumina rather than mono-crystalline sapphire, but it is still a concern which should be addressed. Although this is not desirable, it doesn't necessarily present an immediate failure mode for embodiments of the invention if other mitigation measures are taken. These measures can include the deposition of the platinum into a deep channel, carved out of the substrate by anisotropic DRIE etching methods, rather than on the surface of the sapphire, or alternately ensuring the capping layer of alumina has good adhesion in the areas not covered by platinum. This can ensure that the strain measurement is still accurate, as the material may delaminate but will not move, because no gap exists for it to translate into.

If this form of mechanical bounding is not possible or creates unforeseen errors, then a metallization layer can be added to promote adhesion. Studies into this material combination indicate that chromium would be an ideal choice for this purpose, promoting good adhesion across a wide temperature range without significant thermal diffusion into the platinum. Titanium is another option, although this has been shown to diffuse into platinum at relatively low temperatures, starting around 400° C.

Although thermal diffusion is an effect that is best avoided if possible, there are a variety of extended functions that could utilize a degree of well-characterized thermal diffusion. Grain growth in platinum, which has been shown to occur at high levels of thermal exposure, can be controlled via a thermal diffusion agent, such as yttrium. Another possibility is utilizing measurement of a thermal diffusion agent as an alternative to strain measurement as a means of estimating the thermal exposure. If two sides of a bridge circuit have differential exposure to a thermal diffusion agent, then the thermal exposure can be estimated via differential signal decay. Rhodium would be an ideal choice for this application, as the material is widely used as a platinum alloy for high temperature thermocouples and diffuses at a relatively slow rate without creating lattice defects in the platinum material. Rhodium and platinum also have similar a similar CTE, meaning undue strain can be avoided.

Thermal diffusion for a variety of materials has been studied to better understand the performance of thermal barrier coatings for applications such as jet turbines, discharge nozzles, and other applications where metallic components must be protected from rapid oxidation or corrosion. In particular, aluminum and titanium have been well characterized, as these materials are commonly utilized in aircraft engines. Platinum is used as an interstitial material to promote thermal barrier coating adhesion, and the thermal diffusion rate is well characterized as a function of thermal exposure and shared surface area. In particular, a thorough study by Marino et al can be used as a primary reference on this topic, which characterizes the thermal diffusion rate via first-principles quantum mechanics calculations. This source provides a basis for characterizing the rate of thermal diffusion for the selected material in a platinum substrate, if that functionality is desired.

The final secondary material application is the addition of a heat spreader or thermal conductivity layer to ensure that the primary assumption of identical temperature across all parts of the sensor is possible. This can be accomplished by the inclusion of a metallic surface layer on the front of the sensor, deposited above the capping layer. Many materials can be applicable for this purpose, with the primary design criteria being a good match of CTE with the sapphire substrate so that no additional strain in created. Alternatively, the conducive material could be applied in a line or grid formation, to ensure that the material doesn't impact the strain profile. Additional platinum can be a good choice of material for this purpose, as it would resist corrosion and is obviously already used in the sensor construction.

2.2.3.2 Sensor Geometry Selection

Figure 6:
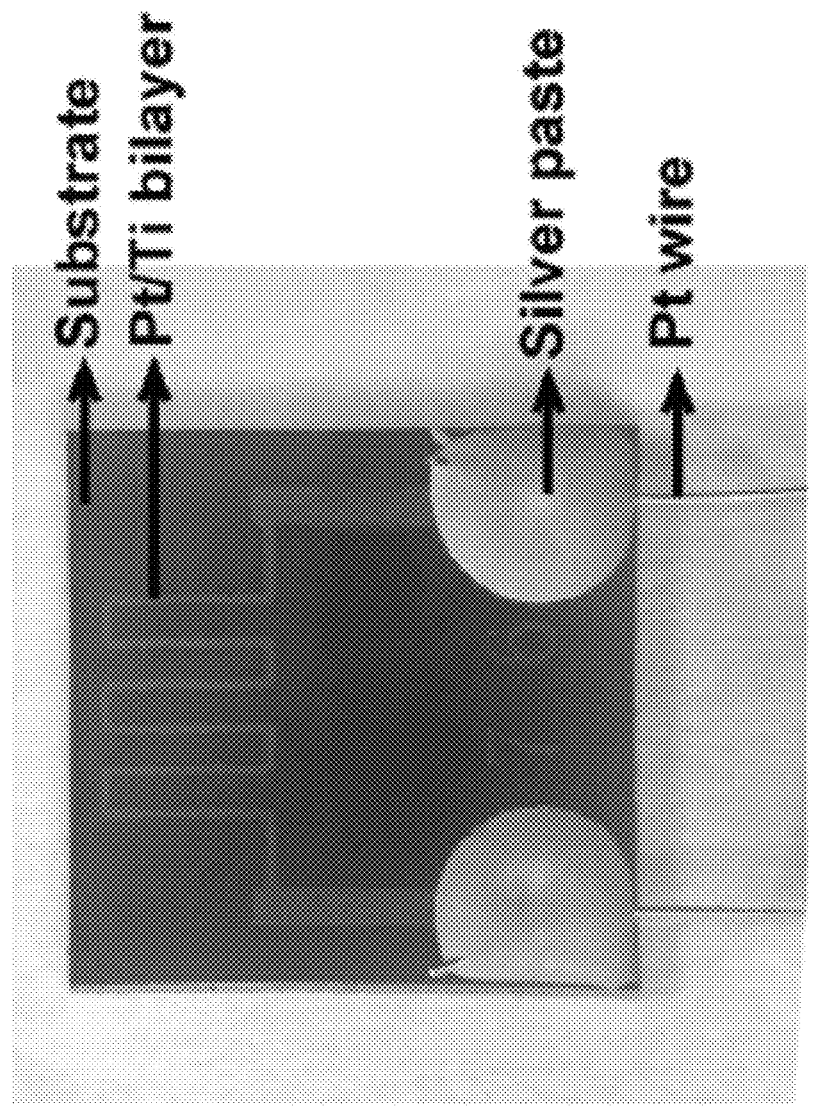
FIG. 6 shows exemplary MEMS Pt/Ti RTD on alumina and silicon dioxide substrates.

Thin film RTD sensors typically utilize a "meander" type geometry in which the sensing material is deposited in a thin trace which traverses multiple times across a given surface to create a very long, thin conductive path. Considerations must be taken to ensure that the substrate supporting the sensor does not undergo material transitions which would induce irregular or non-repeatable strain on the sensing element across a given temperature range. Regular, repeatable thermal induced strain, such as that produced by a mono-crystalline substrate is expected and, in this case, encouraged. A thin film RTD is presented in FIG. 6 to provide a visual reference for a common trace geometry.

For traditional RTDs, the sensing element is usually coiled around a central support pillar to prevent differential expansion between the substrate and sensing material from inducing stress in the sensing element. Thin film RTDs must be applied directly to the substrate surface, so this mitigation technique is not applicable. Some attempts at emulating this approach have been investigated, by creating a small cavity under the sensing material and allowing it to float freely, anchored by only a few points of contact. This technique produces a sensor which is then more vulnerable to dynamic forces, such as vibrations or impacts which cause the unsupported sensing element to deform and thus changes the calibration curve of the instrument in ways that are difficult to predict.

For embodiments of the invention, it can be assumed that the thin film sensor must be created directly atop the supporting substrate and uses a meander geometry which is comprised of a thin sensing element connected to terminal pads. If a two-sided fabrication process is employed, then one side can have the resistive trace deposited and the other side can have the connection points for signal wire leads, as depicted in FIG. 1A, previously described. Further, the sensor can be mounted to the surface of an unfueled graphite pebble, with the resistive trace facing outwards and the wire termination points facing inwards. This mounting configuration would be identical for both wired and wireless operation, with the center volume of the pebble reserved for signal wire routing or to house a wireless signal transmitter. This configuration is depicted in FIG. 1B, previously described.

Ideally, these terminal pads are deposited atop vias which route the electrical connection to the back of the sensor, where it would then be connected to a signal wire or to terminations for a wireless antenna for remote sensing applications. If this approach is not possible due to difficulty creating the vias or unintended effects of the three-dimensional strain that vias create as they undergo thermal expansion, then an alternate single-sided geometry can be used. In this alternate configuration, termination pads are instead included on the upper surface of the sensor, adjacent to the resistive trace. If this configuration is utilized, the sensor would be installed with the resistive traces and termination pads facing toward the center of the fuel pebble so that the signal wire lead terminations can be protected from the harsh environment. The trade-off for this configuration is a reduced sensor response time, as the sapphire substrate would then insulate the sensor from the surrounding environment.

For some embodiments of the invention, the instrument leads can be wired, but wireless signal transfer can also be implemented. Thus, one exemplary sensor embodiment can be a simple resistive element with exposed signal wire termination pads.

Figure 7:
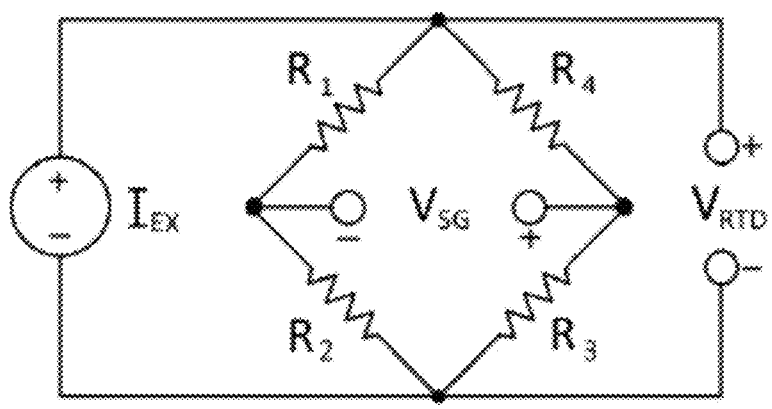
FIG. 7 shows detailed hybrid Ohm measurement and WSB circuit diagram.

The resistance of an RTD sensor can be most accurately measured using a 4-wire Ohm measurement circuit, while the resistance of a strain gauge is measured using a Wheatstone bridge, or WSB, circuit. These circuits measure different parameters of resistance, with a 4-wire Ohm circuit measuring the absolute resistance of a sensor trace while a WSB circuit measures differential resistance between two identical legs of the sensor trace. These two measurement circuits are comprised of similar components and are directly comparable, with the 4-wire Ohm measurement essentially being a special configuration of a WSB, as depicted in FIG. 3. A more detailed circuit configuration is depicted in FIG. 7.

The exemplary single array embodiment is depicted in FIG. 1A, with the continuous resistive trace comprising a dual RTD element as well as a full bridge strain element. Each array can be self-contained as an independent unit, with one or more of these single array embodiments installed onto a single graphite sphere (e.g. at six possible locations illustrated in FIG. 1C), although it is assumed that only one array will be utilized for each graphite pebble in this case.

As the temperature of the instrument rises, the differential thermal expansion of the sapphire substrate X- and Y-axis causes the resistance of the four legs of the WSB to diverge, with the voltage measurement between the two sides of the bridge rising proportionally to the magnitude of the differential thermal expansion. A key feature of this circuit configuration is that the full-bridge WSB circuit generates a differential voltage at the indicated measurement points, but the resistance of the two sides of the circuit will stay balanced, as the axis-dependent resistance increase is equally divided by both sides of the circuit. This allows the resistance measurement of the entire circuit to be used to determine the temperature via the 4-wire Ohm measurement. If the two sides of the circuit did become unbalanced, the RTD measurement would not be accurate, as both sides of the circuit must be equal for the flow of current to be equally divided, thus making the integrated resistance proportional to the instrument temperature.

For this measurement scheme to operate accurately, the four legs of the WSB must be identical in both geometry and materials and they must all be exposed to the same environmental temperature and material transitions. The use of a mono-crystalline substrate should enable the strain created from thermal expansion to be uniform across the device. As mentioned earlier, a heat spreader, or thermal conduction layer, could be added to the instrument if a temperature gradient is expected. However, it can be assumed that these deviations do not occur and the device will be as simple as possible to avoid the complex analysis required for additional materials.

The key geometric parameters which will be varied for sensitivity analysis are few, due to the simplicity of the sensor geometry. These include the trace cross-sectional dimensions and length, the meander path of the trace, the minimum radius of trace bends, and the dimensions of the substrate and capping or shielding layer above the trace. The specific dimensions of the vias and terminal pads are not analyzed, as these do not contribute to the operation of the instrument directly.

Given the target resistance of each of the sensor legs at TPW being 25 $\Omega$, the calculation of the trace length is straightforward, utilizing Equation 2-1 and material properties taken from Table 2-1, above. The trace length and cross-sectional area are dependent upon each other, with a larger cross-sectional area resulting in a longer trace and vice-versa, assuming a similar trace profile to those found in literature, so that the same annealing and thermal diffusion parameters can be applied, a platinum film thickness of 4.0 $\mu$m is selected, with a trace width of 40.0 $\mu$m, creating a rectangular cross-sectional profile. This results in a cross-sectional area of $1.6 \times 10\text{-}10$ m$^2$, which requires a trace length of 40.96 mm to achieve the desired TPW resistance.

Figure 8:
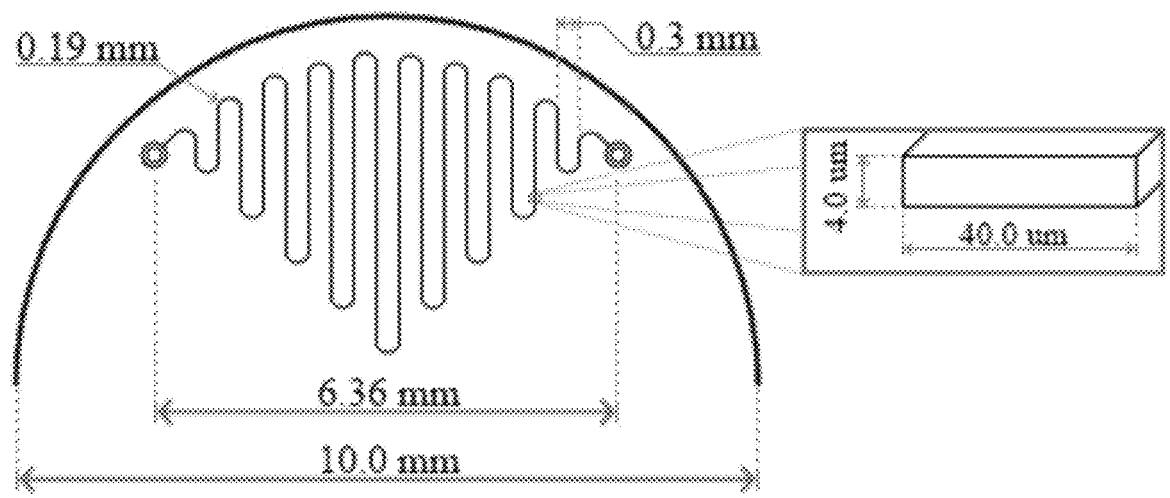
FIG. 8 shows exemplary trace geometry dimensions.

The meander path and bend radius of the trace is dependent upon the area being covered by the trace. If the trace is assumed to cover 25% of the sensor surface area, with approximately 20% of the total area being reserved for buffer regions between the sensor traces and around the outer edge of the sensor, that leaves approximately 20% of the surface area to be covered by the instrument trace. For an instrument diameter of 10 mm, this would be an individual trace area of 15.71 mm2 with a distance of approximately 6.36 mm from via-to-via and an average perpendicular traverse of approximately 0.3 mm between trace switchbacks. This would allow for approximately 18 switchbacks with a maximum minimum bending radius of 0.19 mm. This results in an axial strain sensitivity ratio, defined as the ratio of parallel to perpendicular trace traverse length, of 5.54 for the targeted strain axis. These exemplary dimensions are depicted in FIG. 8.

As previously described, the complete exemplary instrument can be comprised of four of these resistive traces, each connected with a terminal pad of arbitrary dimensions. The next sections summarize the critical parameters and provide renders of an exemplary sensor, array, and instrument configuration.

2.2.4 Exemplary Embodiment Instrument Design Parameters

Figure 9:
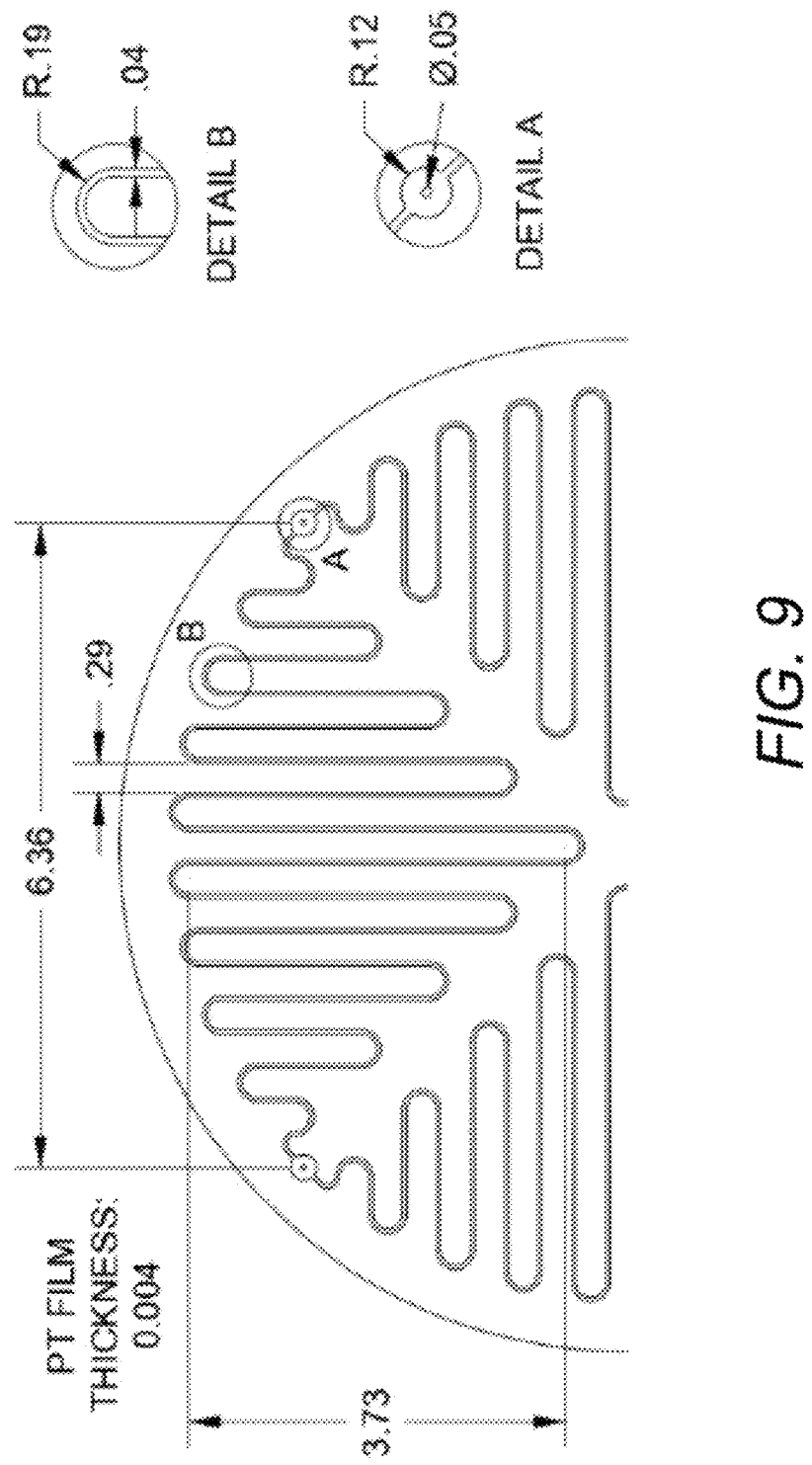
FIG. 9 shows exemplary embodiment sensor trace geometry.
Figure 10:
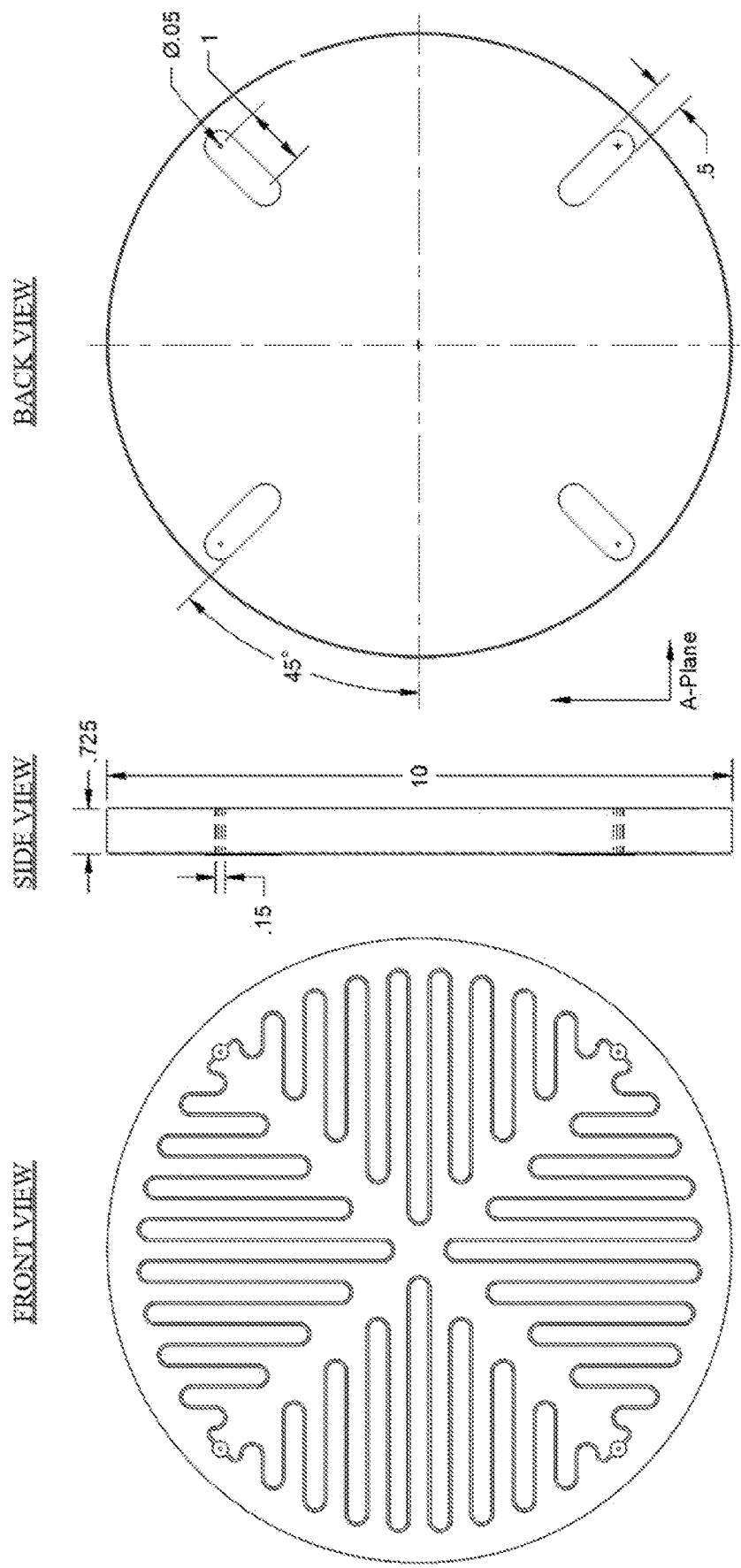
FIG. 10 shows exemplary embodiment sensor front, side, and back views.

The exemplary embodiment sensor design parameters are summarized and listed in Table 2-2, below. The sensor trace geometry detail is depicted in FIG. 9 and the sensor front and back are depicted in FIG. 10.

TABLE 2-2

Exemplary Instrument Design Parameters

| Parameter | Unit | Value |
|---|---|---|
| Trace material/purity | | Platinum (Pt)/99.999% (5N) |
| Resistivity (TPW) | nΩ m | 97.65 |
| Film thickness | μm | 4.0 |
| Trace width | μm | 40.0 |
| Trace cross-sectional area | mm$^2$ | $1.6 \times 10^{-4}$ |
| Trace length | mm | 40.96 |
| Resistance (TPW) | Ω | 25.0 |
| Axis parallel legs | | 18 |
| Axial strain sensitivity ratio | | 5.54 |
| Substrate material/purity | | α-Alumina (Al$_2$O$_3$)/99.999% (5N) |
| Substrate thickness | μm | 725 ± 25 |
| Crystal lattice orientation | | A-Plane (11$\bar{2}$0) |
| Instrument package diameter | mm | 10.0 |

Figure 11:
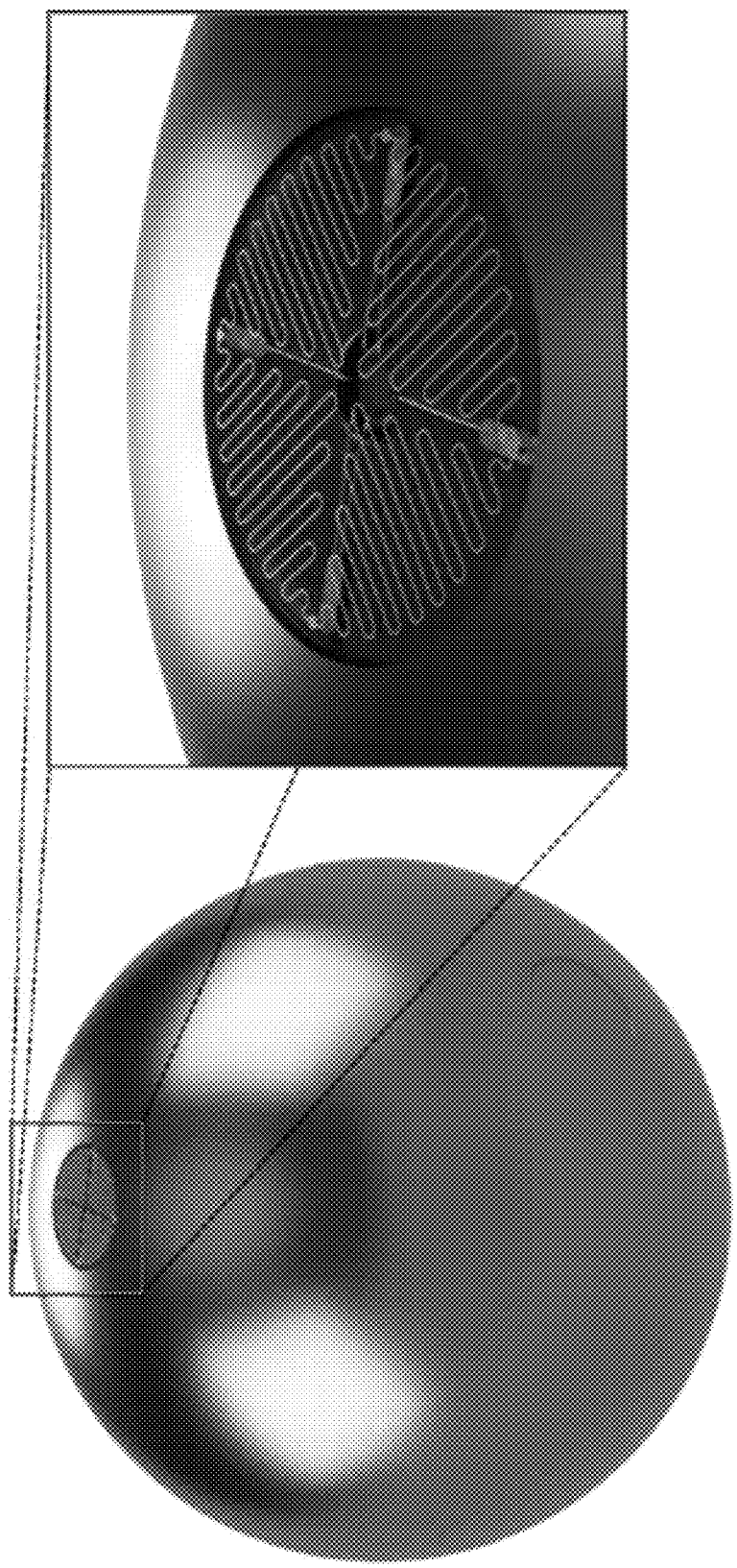
FIG. 11 shows a CAD model render of an exemplary sensor mounted on a fuel pebble.
Figure 12A:
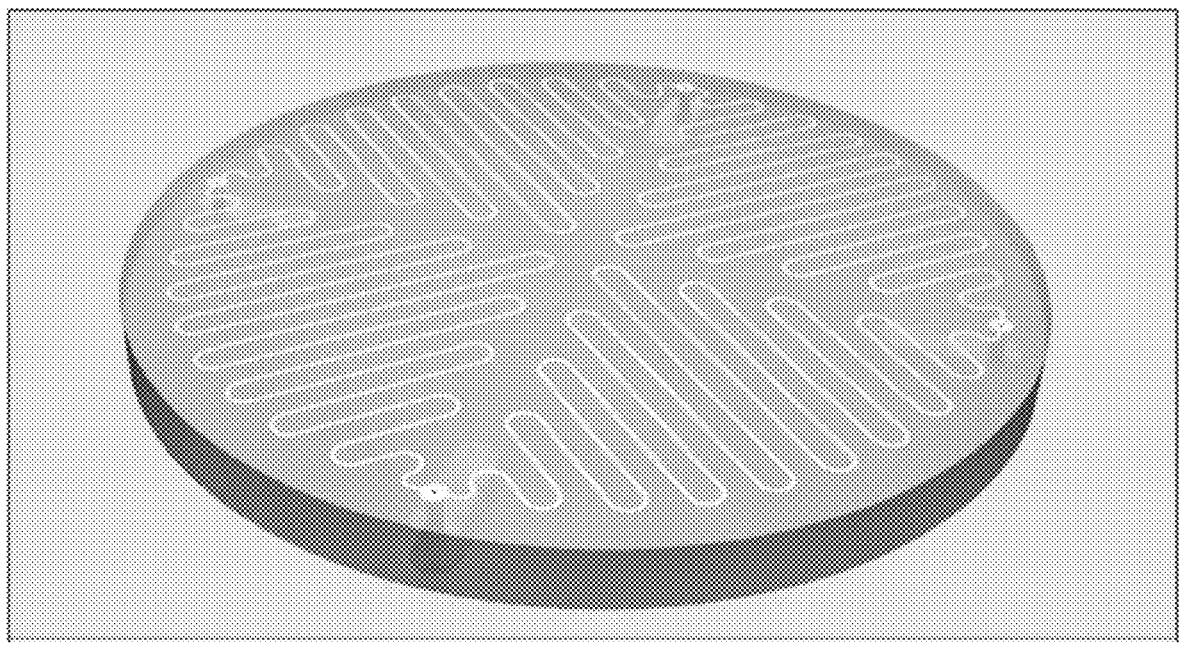
FIGS. 12A and 12B show a CAD model render of the exemplary embodiment sensor, top and bottom faces, respectively.
Figure 12B:
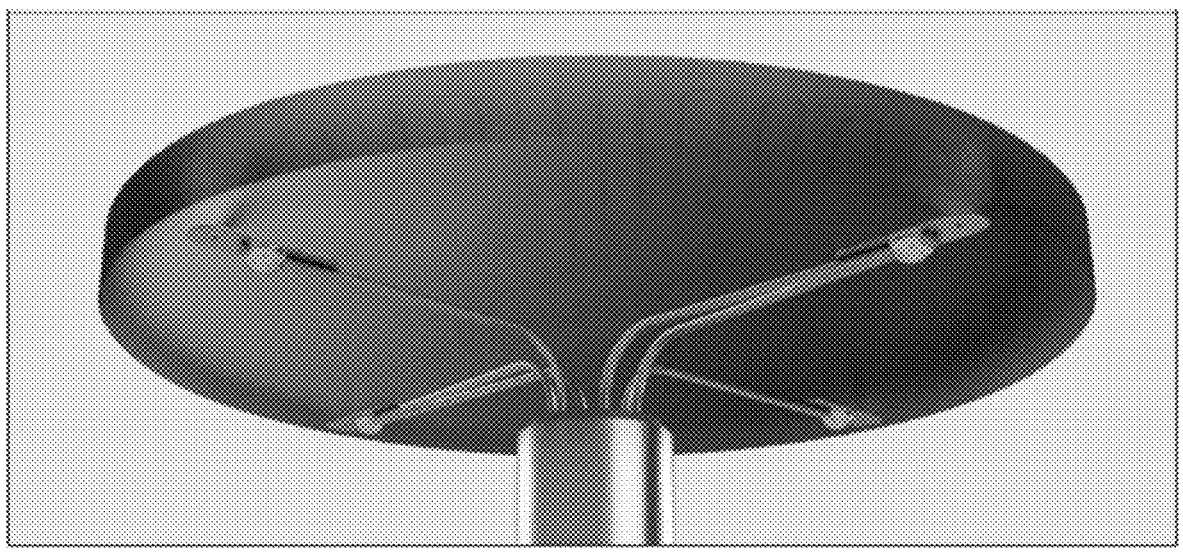

A CAD model of the proposed sensor was constructed to create engineering drawings and images of the final geometry. A rendered model of an exemplary embodiment sensor installed on an unfueled pebble is presented in FIG. 11. A rendered model of the upper and lower faces of the exemplary embodiment sensor is depicted in FIGS. 12A and 12B. Note that the capping layer is not shown.

2.3 MEMS Thin-Film Fabrication Sequence

Fabrication of the proposed instrument is relatively straightforward. The A-plane sapphire substrate is available from commercial suppliers and can be ordered with a surface finish that is ready for processing. If no secondary materials are required, the process follows the general steps of applying the lift-off technique to deposit the desired geometric pattern of platinum in the thickness desired on the front and back of the substrate, laser drilling and deposition of the via channels, followed by the deposition of the capping or shielding layer, and concluding with an annealing process to resolve any lattice defects or residual stress. Following these steps, the wafer can be diced into individual sensors, which should be calibrated to establish the reference relation between the RTD and strain gauge sensors before being placed into service.

2.3.1 Overview of Proposed Fabrication Sequence and Processes

Each of the following sections investigates a specific portion of the fabrication sequence, with parameters taken from a collection of primary references which have characterized the process thoroughly. Investigation of fabrication techniques and annealing times by Han et al., Lin et al., as well as Yi et al. can be applied for this fabrication process. All of these investigators experimented with various deposition pressures, plasma temperatures, masking agents, and annealing profiles.

2.3.1.1 Selection of Bulk Materials for Substrate and Deposition

Instrument design and development assumes commercial availability of sapphire substrate wafers and pure platinum stock for deposition. Although platinum is readily available at purities of 99.9% and 99.99%, the absence of contaminants is vital to the function and accuracy of the sensor, making 99.999% (also called 5N) material highly desirable. This same standard should be applied to the selection of the sapphire substrate, for the same reason. Platinum is able to be zone refined with a vacuum furnace, which may be a viable option for further purification if adequate purity of platinum cannot be procured.

Companies such as AMERICAN ELEMENTS have high purity platinum sputtering targets available in a variety of sizes and electrode backings under the product code PT-M-05-ST (CAS #: 7440-06-4, MDL #: MFCD00011179, EC #: 231-116-1), although any high purity stock material should be appropriate. The form of the sputtering target and backing material depends on the requirements of the plasma sputtering system utilized for fabrication.

High quality sapphire wafers are available for shipment from a wide variety of vendors, although it can be difficult to get the A-plane cut that is required for this application, as it is not regularly used for standard CMOS processes. The material parameters presented in this investigation are specifically referring to the wafers available through MOLTECH GMBH, which are grown via the Kyropoulos method. A variety of other growth methods are available as well as alternate sizes, surface finishes, and dopants. The assumed surface roughness for this investigation is less than 2 nm; although an alternate surface finish could aid in sensing material and capping layer adhesion.

Alumina sputtering targets can be purchased at the same purity and from the same vendors mentioned above, to be used as the capping or shielding layer. Again, contamination control is vital and material purity should be a primary consideration.

2.3.1.2 Lithography and Masking

The patterning process begins with spin-coating of a positive photoresist, such as AZ-4620, followed by a short baking period to set the photoresist, according to the manufacturer's recommendations. A shadow mask pattern is then applied by an UV lithography system. The photoresist is cured and developed fully, followed by a bath in pure acetone to remove any unexposed photoresist. A final rinse and dry cycle in an automated wet bench system will prepare the wafer for deposition. This entire sequence can be performed without operator intervention and with photo-inspection verification via a TOKYO ELECTRON automated wafer handling system coupled with an ASML or NIKON DUV lithography node.

2.3.1.3 Thin-Film Metal Deposition

A LEYBOLD Z550 or equivalent RF/DC magnetron sputtering system is then used to deposit the chromium metallization layer, if it is to be used, to a film thickness of approximately 20 nm. This is followed by the 4.0 μm thick platinum layer, which is applied in short bursts of no more than 3 to 5 minutes at 600 W sputtering power or lower to keep the wafers from heating more than 50° C. The chamber should be at a vacuum pressure of approximately $2.0 \times 10^{-6}$ Pa to $5.0 \times 10^{-4}$ Pa with approximately 300 sccm of argon purge flow, Higher vacuum pressure typically results in larger grain size before annealing, with examples from literature suggesting a nominal size of approximately 40 nm expected for the higher-pressure range and approximately 20 nm expected for the lower-pressure range described.

Although the exact pressure and power used for the plasma sputtering process can be variable, if a chromium adhesions layer is used, various investigators have shown that the lower power sputtering process can help to aid long term stability by allowing a thin oxide film to form between each layer of deposition. This oxide film can act as a passivation layer and delay the effects of thermal diffusion, although an exact characterization of this effect is not well developed. If the chromium metallization layer is not used, then a wider range of sputtering power and pressure can be used, as any internal defects will be resolved in the annealing phase and the initial grain size isn't preserved through the annealing process.

2.3.1.4 Lift-Off Technique

Following the material deposition process, additional layers of photoresist masking can be used to continue building up material, or to cover the sensor if plasma etching is desired to shape the underlying substrate. After all deposition is complete, the wafer should be placed in a heated bath of acetone or sodium hydroxide to remove the remaining cured photoresist as well as any material deposited on the zero-layer mask.

At this point, the wafer can be inspected for conformance to the geometric pattern, as lift-off defects can be common if the process isn't well established for the geometry being developed. Defects include areas which were not removed completely by the photoresist masking, which could allow a short to form between legs of the resistive trace. Once the geometric tolerances are verified, the wafer should be cleaned and dried once again in preparation for the addition of the capping or shielding layer.

2.3.1.5 Capping or Shielding Layer Ceramic Deposition

The final layer to be added to the material stack is the capping or shielding layer of alumina, which is applied via the same sputtering method as the metallic thin films. Again, the use of low plasma power and short bursts is recommended, as it will help to adhere the capping layer to the underlying substrate and prevent delamination. The target film thickness can be in the range of 10.0 μm, although a thicker capping layer can be utilized if needed. A trade-off between sensor responsiveness and corrosion resistance should be evaluated for thicker insulating films.

2.3.1.6 Annealing

The final step of preparation includes annealing to relieve any residual stress in the resistive trace and capping layer and to allow any voids or lattice vacancies to be filled. A wide range of annealing temperatures and times have been investigated, with various recommendations from different authors. The general consensus is that annealing should be performed at a minimum of 700° C. and a maximum of 900° C., in a tube furnace utilizing an ultra-pure nitrogen or argon purging gas, at a ramp rate of no more than 3.0° C. per minute, for a thermal soak period of approximately two hours to allow the metallic films to reach an equilibrium state regarding lattice vacancies and defect concentration. Grain size will continue to grow in the (111) orientation for times longer than two hours, however this is not expected to have a large impact on the initial calibration of the sensor.

After the annealing period is complete, the temperature should be reduced by no more than 50° C. per hour until a temperature of 600° C. is reached, at which point a faster cooling rate of up to 180° C. per hour can be utilized to avoid undue oxidation.

2.3.1.7 Post-Processing and Initial Calibration

The final step following annealing is the post processing. This includes the dicing of the large wafer into individual sensors, trimming the edges of the substrate to reach the final instrument diameter of 10 mm, brazing the lead wires into place, and mounting the sensors into unfueled graphite fuel pebbles.

The lead wires are typically brazed with a platinum paste with a mass fraction of 82.6% or higher to prevent residual flux from contaminating the sensor. The lead wires should be set with a high temperature sintering oven, at a temperature of at least 800° C. for 10 minutes, following the same cooldown sequence used for annealing.

After the lead wires are attached, the instruments should be affixed in their mounting position. A multi-mount mock fuel pebble, such as is depicted in FIG. 1C can be used. Consideration should be given to instrument signal wire routing and the isolation of external forces on the surface of the instrument, given that the position and orientation of the fuel pebble within the testing space may be uncontrolled, it is expected that some instruments may have external forces applied. By recessing the surface of the instrument slightly below the fuel pebble surface, this loading should be minimized.

Once the instrument is installed in its service location, a precise final calibration should be precisely performed to develop an accurate initial calibration curve for the instrument. A high accuracy and very stable calibration oven should be used with a SPRT or HTSPRT calibration reference, following standard procedures for process instrument calibration. The soaking times for each calibration point above 200° C. must be extended dramatically to ensure that all residual thermal stress in the film is annealed. The instrument should not exhibit significant temporal error if a long soak time is used. If these effects are present, additional annealing may be required to ensure the platinum film has reached equilibrium or 'ground state' for each calibration point.

2.3.1.8 Alternative and Additional Non-Critical Fabrication Processes

Additional fabrication steps are necessary if a thermal conduction layer, adhesion promoter, or thermal diffusion layer is desired. Each of these components will follow the same general approach described previously, utilizing a similar lift-off technique, although the specific parameters of the deposition and annealing steps may be slightly different with these extra components included.

Another key design variation which may be necessary is the deposition of the platinum resistive trace in a recessed channel of the sapphire substrate rather than simply on the surface of the substrate. A channel approximately the same size of the sensor trace would then need to be etched in the substrate before the deposition of any metallic materials. The recommended approach for this is to utilize a DRIE anisotropic plasma etching technique to etch a channel straight down along the lattice axis in the substrate. This process is relatively well established for sapphire, with various examples available in literature, but will not be further explored, other than to acknowledge that it may be needed if the sensor material delaminates or behaves differently than is assumed in the performance simulation utilized in later chapters. This alternative geometry may allow the shielding layer to better adhere to the substrate as well, as it would be deposited on a flat plane instead of the varied geometry of the trace element atop the substrate.

Also not included in the preceding fabrication sequence is the use of laser drilling and material deposition required for the development of the vias which connect the front and back of the sensor, nor are the steps required to deposit the termination pads on the back of the sensor. These steps are not trivial and would require some specialized processes to ensure that the addition of these features does not impact the overall function of the sensor. However, these features can easily be excluded if an alternative layout is used which places the termination pads on the same side of the substrate as the sensor trace, as described in the previous sections. Thus, because these features are not vital to the performance of the instrument, but would require significant additional investigation, they are not further explored in terms of development of a fabrication sequence in this section due to the limited resources of the project. The layout utilizing the vias and termination pads on the back of the sensor will be assumed, but the fabrication process described is only applicable for a single sided sensor design.

2.3.2 Fabrication Parameter Variation

Variation in parameters during fabrication is somewhat expected and unavoidable, however MEMS manufacturing processes have an extremely high precision ceiling, if advanced processes are utilized, accuracy and precision can be increased dramatically, but at increased marginal manufacturing cost.

Assuming that initial variance of the sapphire wafers meets the manufacturers specifications, no more than ~5% of geometric variance was observed in the investigations which informed the manufacturing process summarized here. This variance was primarily derived from errors in the lithography and lift-off processes, including focus instability on the shadow mask and cases in which the lift-off process 'chipped' off unintended material.

Lithography errors can be reduced by utilizing an immersed DUV lithography system as opposed to the dry system utilized by the initial researchers. These systems have a resolution in the tens of nanometers and would provide adequate precision to ensure lithography errors are minimized, if not eliminated entirely.

Errors stemming from the lift-off technique can be solved by breaking the process up into multiple layers, with each layer being slightly thinner and thus, less likely to remove unintended material. If this is ineffective, a plasma etching process can be implemented instead, where an additional mask is used to cover the sensor trace and the unwanted platinum is removed with targeted plasma oxidation. This process offers increased accuracy at the cost of a slower processing rate and possible thermal stress on the surrounding materials.

Another source of error is in the rate of deposition, with an average film thickness error of 1.2% to 1.6% observed in a single film and less than 0.3% average film thickness error observed across multiple devices. The film thickness dimensions from the source investigations were typically validated using X-ray fluorescence spectroscopy, although other methods are available. If film thickness variation must be avoided, then lowering the sputtering power to decrease the material deposition rate should allow for better control of this parameter.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A temperature sensor, comprising:
a nonconducting substrate having a surface aligned with a plane of the substrate and exhibiting an anisotropic coefficient of thermal expansion (CTE) in the plane;
electrical traces bonded to the surface of the nonconducting substrate, the electrical traces comprising four meander-lines forming a Wheatstone bridge circuit; and
a graphite spherical pebble where the nonconducting substrate is disposed on a surface of the graphite spherical pebble.

2. The temperature sensor of claim 1, wherein the nonconducting substrate comprises sapphire.

3. The temperature sensor of claim 2, wherein the plane of the substrate is oriented with a 1120 crystal lattice of the sapphire.

4. The temperature sensor of claim 1, wherein the electrical traces comprise platinum.

5. The temperature sensor of claim 1, wherein a highest CTE of the anisotropic CTE in the plane of the substrate is aligned with a pair of the electrical traces.

6. The temperature sensor of claim 1, wherein the graphite spherical pebble comprises a port from the nonconducting substrate to a central cavity for housing transmitting electronics.

7. The temperature sensor of claim 1, further comprising a first electrical contact, a second electrical contact, a third electrical contact, and a fourth electrical contact;
wherein the electrical traces comprise:
a first meander-line trace having a first pair of opposite ends electrically coupled respectively to the first electrical contact and the second electrical contact;
a second meander-line trace having a second pair of opposite ends electrically coupled respectively to the second electrical contact and the third electrical contact;
a third meander-line trace having a third pair of opposite ends electrically coupled respectively to the third electrical contact and the fourth electrical contact; and
a fourth meander-line trace having a fourth pair of opposite ends electrically coupled respectively to the fourth electrical contact and the first electrical contact.

8. The temperature sensor of claim 7, wherein the nonconducting substrate comprises a circular shape and the first electrical contact, the second electrical contact, the third electrical contact, and the fourth electrical contact are disposed proximate a circumferential edge of the circular shape ninety degrees apart from one another.

9. A temperature sensor, comprising:
a graphite spherical pebble having at least one nonconducting substrate supporting a Wheatstone bridge trace temperature sensor disposed on a surface of the graphite spherical pebble over a port to a central cavity, the Wheatstone bridge trace temperature sensor comprising four meander-line traces and having four electrical contacts for measuring temperature; and
sensor wiring for the Wheatstone bridge trace temperature sensor is coupled from the four electrical contacts through the port to the central cavity of the graphite spherical pebble.

10. The temperature sensor of claim 9, wherein the nonconducting substrate comprises sapphire.

11. The temperature sensor of claim 10, wherein the plane of the substrate is oriented with a 1120 crystal lattice of the sapphire.

12. The temperature sensor of claim 9, wherein the electrical traces comprise platinum.

13. The temperature sensor of claim 9, wherein a highest CTE of an anisotropic CTE of the surface of the nonconducting substrate is aligned with an opposing pair of the four meander-line traces.

* * * * *